United States Patent
Rangasamy et al.

(10) Patent No.: US 10,411,947 B2
(45) Date of Patent: Sep. 10, 2019

(54) HOT SWAPPING AND HOT SCALING CONTAINERS

(71) Applicant: Equinix, Inc., Redwood City, CA (US)

(72) Inventors: Venkatachalam Rangasamy, San Jose, CA (US); Parveen Kumar, Fremont, CA (US); Jaganathan Jeyapaul, San Jose, CA (US); Brian J. Lillie, Los Altos, CA (US)

(73) Assignee: EQUINIX, INC., Redwood City, CA (US)

( * ) Notice: Subject to any disclaimer, the term of this patent is extended or adjusted under 35 U.S.C. 154(b) by 153 days.

(21) Appl. No.: 15/392,820

(22) Filed: Dec. 28, 2016

(65) Prior Publication Data

US 2017/0244787 A1 Aug. 24, 2017

Related U.S. Application Data

(60) Provisional application No. 62/332,385, filed on May 5, 2016, provisional application No. 62/286,259, filed on Jan. 22, 2016.

(51) Int. Cl.
*H04L 29/08* (2006.01)
*H04L 12/24* (2006.01)
(Continued)

(52) U.S. Cl.
CPC ...... *H04L 41/0654* (2013.01); *H04L 12/4679* (2013.01); *H04L 12/4683* (2013.01); *H04L 41/5045* (2013.01); *H04L 43/0817* (2013.01); *H04L 43/10* (2013.01); *H04L 45/021* (2013.01); *H04L 61/3015* (2013.01); *H04L 67/02* (2013.01); *H04L 67/10* (2013.01);
(Continued)

(58) Field of Classification Search
CPC ... H04L 41/0654; H04L 45/021; H04L 69/40; H04L 12/4679; H04L 12/4683; H04L 41/5045; H04L 61/3015; H04L 67/16; H04L 67/02; H04L 67/1095; H04L 67/1097; H04L 43/0817; H04L 43/10; H04L 67/10; H04L 61/15
See application file for complete search history.

(56) References Cited

U.S. PATENT DOCUMENTS 9,690,622 B1 * 6/2017 Argenti ............... G06F 9/5027
2004/0003035 A1 1/2004 Sesek
(Continued)

OTHER PUBLICATIONS

International Search Report and Written Opinion of International Application No. PCT/US2016/1669626, dated May 4, 2017, 15 pp.
(Continued)

*Primary Examiner* — Abdullahi E Salad
(74) *Attorney, Agent, or Firm* — Shumaker & Sieffert, P.A.

(57) ABSTRACT

Techniques for hot swapping and hot scaling containers between cloud services are disclosed. In one example, a method includes storing, with a cloud exchange, data indicating an association of a first container of a first private network with a second container of a second private network, wherein the first private network and the second private network are coupled to the cloud exchange to send and receive data packets via the cloud exchange. The method further includes sending, with the cloud exchange based on the association, state of the first container to the second container.

28 Claims, 8 Drawing Sheets

(51) Int. Cl.
*H04L 12/755* (2013.01)
*H04L 29/14* (2006.01)
*H04L 12/46* (2006.01)
*H04L 29/12* (2006.01)
*H04L 12/26* (2006.01)

(52) U.S. Cl.
CPC ...... *H04L 67/1095* (2013.01); *H04L 67/1097* (2013.01); *H04L 67/16* (2013.01); *H04L 69/40* (2013.01); *H04L 61/15* (2013.01)

(56) References Cited

U.S. PATENT DOCUMENTS

| | | | |
|---|---|---|---|
| 2010/0191851 | A1 | 7/2010 | Raja et al. |
| 2012/0030672 | A1 | 2/2012 | Zygmuntowicz et al. |
| 2012/0054367 | A1* | 3/2012 | Ramakrishnan ...... G06F 9/4856 709/242 |
| 2013/0268643 | A1* | 10/2013 | Chang ................. G06F 9/45558 709/223 |
| 2013/0297662 | A1 | 11/2013 | Sharma et al. |
| 2014/0075243 | A1* | 3/2014 | Nagaraj .............. H04L 43/0811 714/32 |
| 2014/0127254 | A1 | 5/2014 | Sayre et al. |
| 2014/0130038 | A1 | 5/2014 | Lucovsky et al. |
| 2014/0201218 | A1 | 7/2014 | Catalano et al. |
| 2014/0317261 | A1* | 10/2014 | Shatzkamer ............ G06F 9/455 709/223 |
| 2014/0325515 | A1 | 10/2014 | Salmela et al. |
| 2014/0337528 | A1 | 11/2014 | Barton et al. |
| 2014/0344395 | A1 | 11/2014 | Alexander |
| 2014/0366155 | A1 | 12/2014 | Chang et al. |
| 2015/0156251 | A1 | 6/2015 | Zhou |
| 2015/0326648 | A1 | 11/2015 | Diwakar |
| 2015/0370586 | A1* | 12/2015 | Cooper ............... G06F 9/45533 710/308 |
| 2016/0088092 | A1 | 3/2016 | Cardona-Gonzalez et al. |
| 2016/0127454 | A1 | 5/2016 | Maheshwari et al. |
| 2016/0219019 | A1* | 7/2016 | Mathur ............... H04L 63/0272 |
| 2016/0308762 | A1 | 10/2016 | Teng et al. |
| 2016/0330138 | A1* | 11/2016 | Thomason ............. H04L 67/10 |
| 2016/0337474 | A1* | 11/2016 | Rao ......................... H04L 49/25 |
| 2016/0350105 | A1 | 12/2016 | Kumar et al. |
| 2016/0373275 | A1* | 12/2016 | Al-Asaaed .......... H04L 12/4641 |
| 2017/0041384 | A1 | 2/2017 | Son et al. |
| 2017/0052807 | A1* | 2/2017 | Kristiansson ............. G06F 9/54 |
| 2017/0118042 | A1* | 4/2017 | Bhattacharya ........ H04L 12/462 |
| 2017/0147324 | A1* | 5/2017 | Weber ....................... G06F 8/65 |
| 2017/0149687 | A1 | 5/2017 | Udupi et al. |

OTHER PUBLICATIONS

"Docker Overview," Docker, Inc., retrieved from docs.docker.com/engine/understanding-docker, Jul. 9, 2016, 10 pp.
Brand et al., "Manage Workflows, Save Staff Time with Hybrid Cloud Automation," retrieved from community.netapp.com/t5/Tech-OnTap-Articles/Manage-Workflows-Save-Staff-Time-with-Hybrid-Cloud-Automation/ta-p/116816, Mar. 25, 2016, 5 pp.
Grattafiori, "Understanding and Hardening Linux Containers," NCC Group Whitepaper,Version 1.0, Apr. 20, 2016, 122 pp.
Koty et al., "Software Engineering Innovation at Equinix: A Cultural Shift," The Equinix Blog, Sep. 23, 2015, 10 pp.
Tarazi, "Everyone is Talking About Docker Containers," The Equinix Blog, Dec. 3, 2014, 3 pp.
U.S. Appl. No. 15/395,101, by Parveen Kumar, et al., filed Dec. 30, 2016.
U.S. Appl. No. 15/228,471, by Parveen Kumar, et al., filed Oct. 29, 2015.
U.S. Appl. No. 15/223,740, by Venkatachalam Rangasamy, et al., filed Jul. 29, 2016.
Invitation to Restrict or Pay Additional Fees from International Application No. PCT/US2016/69626, dated Mar. 7, 2017, 2 pp.
International Preliminary Report on Patentability from International Application No. PCT/US2016/069626, dated Aug. 2, 2018, 12 pp.

* cited by examiner

HOT SWAPPING AND HOT SCALING CONTAINERS

This application claims the benefit of U.S. Provisional Application No. 62/286,259, filed Jan. 22, 2016, and U.S. Provisional Application No. 62/332,385, filed May 5, 2016, the entire contents of both of which are incorporated by reference herein.

TECHNICAL FIELD

The disclosure relates to computer networks and, more specifically, to cloud services.

BACKGROUND

Cloud computing refers to the use of dynamically scalable computing resources accessible via a network, such as the Internet. The computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "cloud services," refers not only to services provided by a cloud, but also to a form of service provisioning in which cloud service customers contract with cloud service providers for the online delivery of services provided by the cloud. Cloud service providers ("CSPs") manage a public, private, or hybrid cloud to facilitate the online delivery of cloud services to one or more cloud service customers.

A cloud exchange may allow private networks of a customer of the cloud exchange to be interconnected to any other customer of the cloud exchange at a common point, thereby allowing direct exchange of network traffic between the networks of the customers. Customers may include network carriers (or network service providers), enterprises, and other users of cloud services offered by one or more CSPs. One example use of a cloud exchange is to interface a group of customers to a group of CSPs. Each CSP may provide customer access to a "cloud" computing network, wherein the customer stores, manages, and processes data on a network of remote servers rather than on a local server or personal computer of the customer.

SUMMARY

In general, this disclosure describes techniques for facilitating inter-container communications via a cloud exchange to perform hot swaps and hot scaling of containers, including applications or other resources executing in the containers, to additional containers that may execute on the same or different cloud service networks. The hot swaps may involve copying all code, data, and other state for applications, runtime, and other resources from one container to another, by a cloud exchange, while the container is executing. The cloud exchange may thereby swap (or copy or transfer) the first container to a second container, while the first container is hot, or in the midst of execution, without interrupting or interfering with the execution of the first container and its applications and/or other resources.

The hot scaling may involve the cloud exchange copying portions of code, data, and other state for applications, runtime, and other resources from one container to a number of containers, by a cloud exchange, while the container is executing. The hot scaling may involve the cloud exchange orchestrating and cloning events being executed by the container without impacting applications being executed by the container. This may involve the cloud exchange briefly placing a hold on application transactions during a copy or transfer of code, data, or other state from the first container to the second container, before quickly resuming execution of the events by the containerized applications in the new container. The cloud exchange may thereby scale, or expand, the first container to a number of additional containers, while the first container is hot, or in the midst of execution, also without interrupting or interfering with the execution of the first container and its applications and/or other resources.

For example, a cloud exchange may provide connectivity between an enterprise network that executes one or more applications (e.g., micro-services) using containers, and one or more cloud service provider networks that also execute one or more applications using containers. By causing the containers to register and communicate with the cloud exchange, and to communicate data from one or more first containers to one or more second containers via the cloud exchange-provisioned connectivity, various techniques of this disclosure may enable hot swaps and hot scaling of containerized applications and other resources for the enterprise, elastically and automatically across a wealth of container provisioning resources, including across containers executing at networks or cloud services with different underlying technology infrastructures.

The techniques of this disclosure may provide various advantages. For instance, a cloud exchange provider may leverage the techniques of this disclosure to provide, via a cloud exchange, a hot swap and hot scaling service to an enterprise customer. The enterprise customer may purchase cloud-based resources from a cloud service provider ("CSP") for executing container-based applications deployed to the CSP by the enterprise. The cloud exchange may provision connectivity between containers executing at one or more CSPs, and potentially containers executing at the enterprise's network, and may enable automatic hot swapping and hot scaling of the containers across a potentially large and potentially heterogeneous array of container provisioning resources. A cloud exchange configured to perform hot container swap and hot container scaling techniques of this disclosure may thus expand the scope and flexibility of container resources available to a cloud service customer without imposing container management burden on the enterprise customer.

The hot container swap and hot container scaling techniques of this disclosure may also contribute to additional services and functions performed by a cloud exchange, such as automatic backup, disaster recovery, and expanding scale to handle sudden increases in application demand. For example, in the event of a failure of a first container or other triggering event, the cloud exchange may hot swap the first container for a second container, potentially from a first container at the enterprise network to a second container at a CSP or from a first container at a first CSP to a second container at a second CSP, and redirect application loads for the first container to the second container. As another example, in the event of an overload of a first container or other triggering event, the cloud exchange may hot scale the first container across one or more additional containers, and direct some of the application loads for the first container across the one or more additional containers. In ways such as these, the cloud exchange facilitates seamless application replication and backup services to the cloud. In addition, in some examples, the techniques may permit an enterprise that uses cloud services to avoid an application outage during scheduled or unscheduled downtime of a cloud service provider.

In one example, this disclosure describes a method comprising: storing, with at least one processor of a cloud exchange, data indicating an association of a first container of a first private network with a second container of a second private network, wherein the first private network and the second private network are coupled to the cloud exchange to send and receive data packets via the cloud exchange; and sending, with the at least one processor of the cloud exchange, based on the association, state of the first container to the second container.

In another example, this disclosure describes a computing system comprising at least one memory device and at least one processor comprised in a cloud exchange, operably coupled to the at least one memory device, and configured to execute instructions to: store data indicating an association of a first container of a first private network with a second container of a second private network, wherein the first private network and the second private network are coupled to the cloud exchange to send and receive data packets via the cloud exchange; and send, based on the association, state of the first container to the second container.

In another example, this disclosure describes a computer-readable storage medium comprising instructions for causing at least one programmable processor of a cloud exchange to: store data indicating an association of a first container of a first private network with a second container of a second private network, wherein the first private network and the second private network are coupled to the cloud exchange to send and receive data packets via the cloud exchange; send, based on the association, state of the first container to the second container; receive, by the cloud exchange, cloud service traffic from an enterprise network; and redirect, by the cloud exchange, the cloud service traffic from the first container to the second container.

The details of one or more examples of the techniques of this disclosure are set forth in the accompanying drawings and the description below. Other features, objects, and advantages of the techniques of this disclosure will be apparent from the description and drawings, and from the claims.

DETAILED DESCRIPTION

In general, the disclosure describes techniques for inter-container communications between containers (e.g., Docker containers, LXC containers, CoreOS Rocket containers) for enabling hot swaps and hot scaling of containers, via a cloud exchange, for containers executing at logically isolated networks. For example, techniques are described for transferring the state of a first container, including executable code and data involved in the applications and runtime executing on the first container, to a second container, while the applications of the first container are executing, such that the applications continue executing at the second container. Such transferring of the state of the first container may involve swapping the containerized code and data to a different container, or involve scaling at least some of the containerized code and data to additional containers to elastically increase the processing capability devoted to the containerized applications. The hot swap or hot scaling of the containerized applications may be to different containers located within the same subnet of the same cloud service, to different containers in different subnets of the same cloud service, or to an entirely different cloud service, in different implementations. In cases of hot swaps or hot scaling across different cloud services, which may have different cloud service infrastructure and which may be private or public cloud services, techniques of this disclosure may internally manage all aspects of translating code, data, and state for applications, runtime, and other resources between different cloud infrastructure technology stacks. Techniques of this disclosure may thus ensure that the containerized applications are swapped or scaled across the different cloud services smoothly and with all technology infrastructure differences automatically managed and made compatible by the cloud exchange, as if the potentially heterogeneous underlying cloud services were a uniform container provisioning resource, while also providing transparency into the hot swapping or hot scaling processes to the customers or other users.

Figure 1:
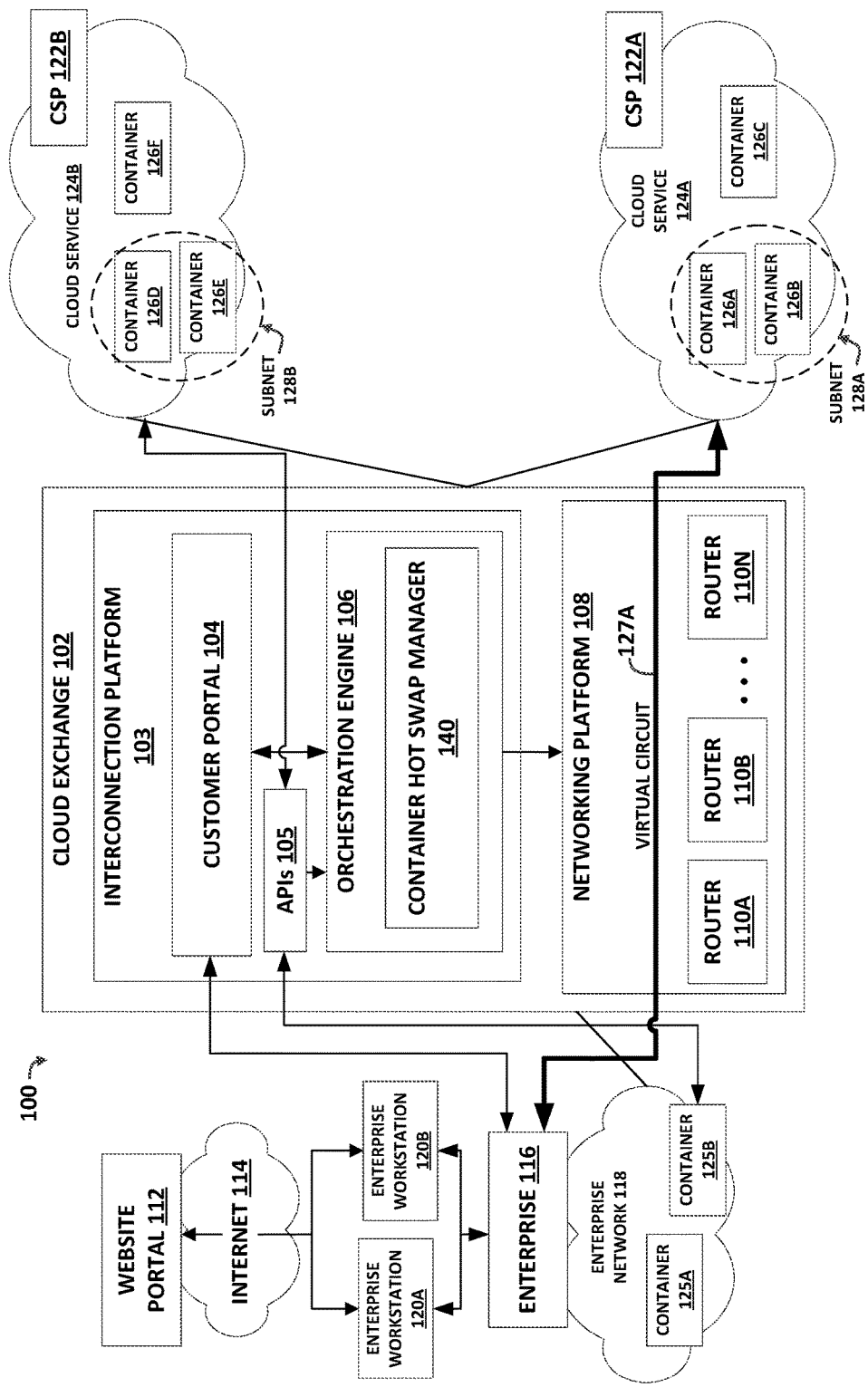
FIG. 1 is a block diagram illustrating an example network in accordance with example techniques of this disclosure.

FIG. 1 is a block diagram illustrating an example system in accordance with example techniques of this disclosure. A cloud exchange may facilitate virtual connections for cloud services delivery with hot swap and hot scaling capability from multiple cloud service providers to one or more cloud service customers. The cloud exchange may enable cloud customers to bypass the public Internet to directly connect to cloud service providers ("CSPs") so as to improve performance, reduce costs, increase the security and privacy of the connections, and leverage cloud computing for additional applications. In this way, enterprises, network carriers, and SaaS customers, for instance, can integrate cloud services with their internal applications as if such services were part of or otherwise directly coupled to their own data center network. The cloud exchange includes an orchestration engine that performs hot swaps and hot scaling of containers and applications executing in the containers.

Cloud exchange 102 may interface cloud service customers such as enterprise 116 to a plurality of cloud services 124A-124B (collectively, "cloud services 124") provided by CSP networks 122A-122B (hereinafter, "CSPs 122"), in a cloud environment 100. As one example of a cloud exchange, an Equinix Cloud Exchange (ECX) provided by Equinix, Inc. may interface a plurality of cloud service customers (e.g., enterprises, organizations, and individuals) to a plurality of CSPs (e.g., such as Microsoft Azure and Amazon Webservices). Cloud exchange 102 may provide one or more interconnections for cloud services delivery from the multiple CSPs 122 to enterprise 116, as well as interconnections between the multiple CSPs 122. An interconnection may represent a physical cross-connect or a virtual circuit in various examples. Additional details of interconnecting networks via a cloud exchange are found in U.S. Provisional Application No. 62/072,976, U.S. patent application Ser. No. 14/927,306, and U.S. patent application Ser. No. 15/099,407, the contents of each of which are hereby incorporated in their entirety by reference herein.

A CSP may provide a virtual machine hypervisor (VM) to a cloud service customer for access to the cloud network. A VM emulates virtual hardware. In other words, each VM provides a virtualized operating system and application suite for customer access. Because the VM is virtualized, the cloud service customer and its applications are isolated from both the hardware of the host and the VMs of other customers. This allows the CSP to provide cloud services that are safe and secure to the cloud service customer. The CSP may implement dozens or hundreds, for example, of VMs on a single network for access by a group of customers. However, because each VM virtualizes a complete operating system, it may consume a significant level of network resources.

A more efficient alternative to a virtual machine in many applications is a virtualized container, such as provided by the open-source Docker container application. Like a VM, each container is virtualized and may remain isolated from a host machine and other containers. However, unlike a VM, each container may omit a full individual operating system, and instead provide only an operating system kernel interface, an application suite, and application-specific libraries. Each container may be executed by the host machine as an isolated user-space instance, and may share an operating system and common libraries with other containers executing on the host machine. Thus, a cloud network using containers may require significantly less processing power, storage, and network resources than a cloud network implementing VMs.

Enterprise 116 deploys an enterprise network 118, such as an enterprise on-premises data center or private cloud, to execute containers 125A, 125B, which provide an operating environment for applications deployed by enterprise 116. In some cases, applications executed by containers 125A, 125B may be microservices. In general, microservices each implement a set of focused and distinct features or functions, and a microservice conforms to (or is usable in) an architectural pattern in which many dozens or hundreds of microservices can be independently developed and deployed. Microservices may be organized around a business capability and may implement a "broad-stack" of software for the business capability, including persistent storage and any external collaboration. The various microservices expose interfaces that enable the microservices to invoke one another to exchange data and perform the respective sets of functions in order to create one or more overall applications. Each of the microservices may adhere to a well-defined Application Programming Interface (API) and may be orchestrated by invoking the API of the microservice. Each of the microservices executes independently and exposes an interface for asynchronous invocation with respect to the other microservices.

Via cloud exchange 102, CSPs 122A-122B may make available cloud services 124A-124B, respectively, to cloud service customers such as enterprise 116, and thereby provide execution environments for applications of enterprise 116. Orchestration engine 106 may provision a virtual circuit 127A between enterprise 116 and cloud service 124A, as further described below. In the illustrated example, each cloud service 124 may host or include a plurality of containers 126 that each provides an execution environment for at least one application (e.g., microservice) deployed by enterprise 116. For example, cloud service 124A may comprise containers 126A, 126B, and 126C, and cloud service 124B may comprise containers 126D, 126E, and 126F. While a few representative containers are depicted in FIG. 1, each cloud service 124A, 124B may include up to a very large number of containers.

Further, a cloud service may group a plurality of containers into network subnets for organizational and network addressing purposes. In the example of FIG. 1, cloud service 124A may group containers 126A and 126B into subnet 128A, while cloud service 124B may group containers 126D and 126E into subnet 128B. Containers 126A and 126B of subnet 128A may execute on the same or on different hosts, the one or more hosts being addressable by a network address that is a member of subnet 128A. In one example, a cloud service may group a plurality of containers into a plurality of subnets to organize services into different subnets. In another example, a cloud service may group a plurality of containers into a plurality of subnets to divide containers among customers of the cloud service.

Cloud exchange 102 includes an interconnection platform 103 that may expose a collection of software interfaces, also referred to and described herein as application programming interfaces (APIs) 105, which may allow access to capabilities and assets of the interconnection platform in a programmable fashion. The APIs 105 may provide an extensible framework that allows software developers associated with customers and partners of cloud exchange 102 to build software applications that access interconnection platform 103 that automatically manages interconnection with multiple cloud service providers 122 participating in interconnection platform 103, to provide interconnection and other services described herein to customers of the provider of cloud exchange 102. Developers from network services providers, cloud service providers, managed service providers, and other enterprises may use the software interfaces exposed by interconnection platform 103 and defined by APIs 105 to build custom applications and frameworks for seamless interaction with interconnection platform 103, to facilitate the delivery of cloud services from cloud service providers 122 to cloud service customers.

These software interfaces defined by APIs 105 enable machine-to-machine communication for near real-time setup and modifications of interconnections, and facilitate inter-container communications and container control as described herein. The software interfaces defined by APIs 105 may also eliminate or reduce the need for human interaction for the interconnection setup and management process. In this way, the software interfaces provide an automated and seamless way to use and manage containers executing at multiple different cloud services or networks connected to cloud exchange 102.

Enterprise 116 may interface a plurality of enterprise workstations 120A-120B (collectively, "enterprise workstations 120") of enterprise 116 to networks outside of enterprise 116. Enterprise 116 may interface enterprise workstations 120 to websites connected to the Internet 114, for example, website portal 112, which may provide enterprise workstations 120 with access to the website of one of CSPs 122. Further, enterprise 116 may interface enterprise workstations 120 to cloud exchange 102. As used herein, actions imputed to enterprise 116, cloud exchange 102, or CSPs 122 may refer to a human operator or automated agent directed by the enterprise 116, cloud exchange 102, or CSP 122.

Enterprise workstations 120 may access customer portal 104 to log into cloud exchange 102. Customer portal 104 may represent a web-based application exposed to customers via a website and accessible using a browser. Customers may use customer portal 104 to sign up for or register cloud services. After a customer has registered with cloud exchange 102 via customer portal 104, the customer may receive a service license identifier (e.g., a registration key). The service license identifier may identify the customer, the type of customer (e.g., business or individual), the services the customer has access to (e.g., public cloud services provided by, e.g., Microsoft Azure or Amazon Web Services), and service parameters such as an amount of service purchased in terms of, e.g., cloud service provider resources (e.g., bandwidth, processing units). Enterprise 116 may receive service license identifiers from the cloud service providers and register the service license identifiers with cloud exchange 102 using customer portal 104.

In some examples, interconnection platform 103 may conform to a microservice-based application architecture. In the example of FIG. 1, interconnection platform 103 includes an internal orchestration engine 106 that organizes, directs and integrates underlying microservices, as well as other software and network sub-systems, for managing various services provided by the cloud exchange 102. Internal orchestration engine 106 includes container hot swap manager 140, as further described below.

Orchestration engine 106 of the interconnection platform 103 for cloud exchange 102 may facilitate the dynamic creation of private connections between enterprise 116 and any of CSPs 122, as well as between CSPs 122, cloud service customers, network service providers, a cloud exchange administrator, or other customers of the cloud exchange. Orchestration engine 106 may receive registration information and service license identifiers from Customer Portal 104 obtained from users at registration. The orchestration framework may use this information to coordinate interactions between a heterogeneous set of unrelated APIs, microservices, Web services, sockets, remote method invocations (RMIs), and the like, that are orchestrated through a workflow, to seamlessly create a private connection (e.g., a virtual circuit) between the enterprise and the multiple cloud service providers. Orchestration engine 106 may be responsible for handling the entire request, which may be received from various channels such as a web portal and an API. Specific techniques for the design and implementation of an orchestration engine are described in U.S. Provisional Application No. 62/072,976 and U.S. patent application Ser. No. 14/927,306, the entire contents of both of which are incorporated by reference herein.

Networking platform 108 may comprise a plurality of routers and switches 110A-110N (collectively, "routers 110"), where "N" represents a number of routers and switches. Networking platform 108 may use routers 110 to transfer data between and among enterprise 116 and cloud services 124A-124B. Orchestration engine 106 may administer the operations of networking platform 108 to facilitate the dynamic creation of private connections between enterprise 116 and cloud services 124A-124B. In the example of FIG. 1, orchestration engine 106 may provision a virtual circuit 127A in the form of a virtual local area network (VLAN)-based and/or IP-VPN-based connection, for instance, between enterprise 116 and networking platform 108 to allow for data transfer between enterprise 116 and CSP 122A. Thus, in accordance with example techniques of this disclosure, orchestration engine 106 may act to facilitate secure, fast, and efficient connections among enterprise 116 and cloud service provider 122 networks.

In accordance with example techniques of this disclosure, cloud exchange 102 may facilitate communications between two containers executing at different networks connected to cloud exchange 102. For example, cloud exchange 102 may facilitate communications between container 125A executing at enterprise 116 and container 126A executing at a network of CSP 122A providing cloud service 124A. Cloud exchange 102 may also facilitate inter-container communications between containers of two different cloud services, e.g., containers 126 executing at a network of CSP 122A providing cloud service 124A and containers 126 executing at a network of CSP 122B providing cloud service 124B, including inter-container communications for hot swaps and hot scaling, as described further below. Facilitating communication between different cloud services may include orchestration engine 106 provisioning a virtual circuit 127B to interconnect the respective networks of CSPs 122A and 122B, as described further below with reference to FIG. 2.

Figure 2:
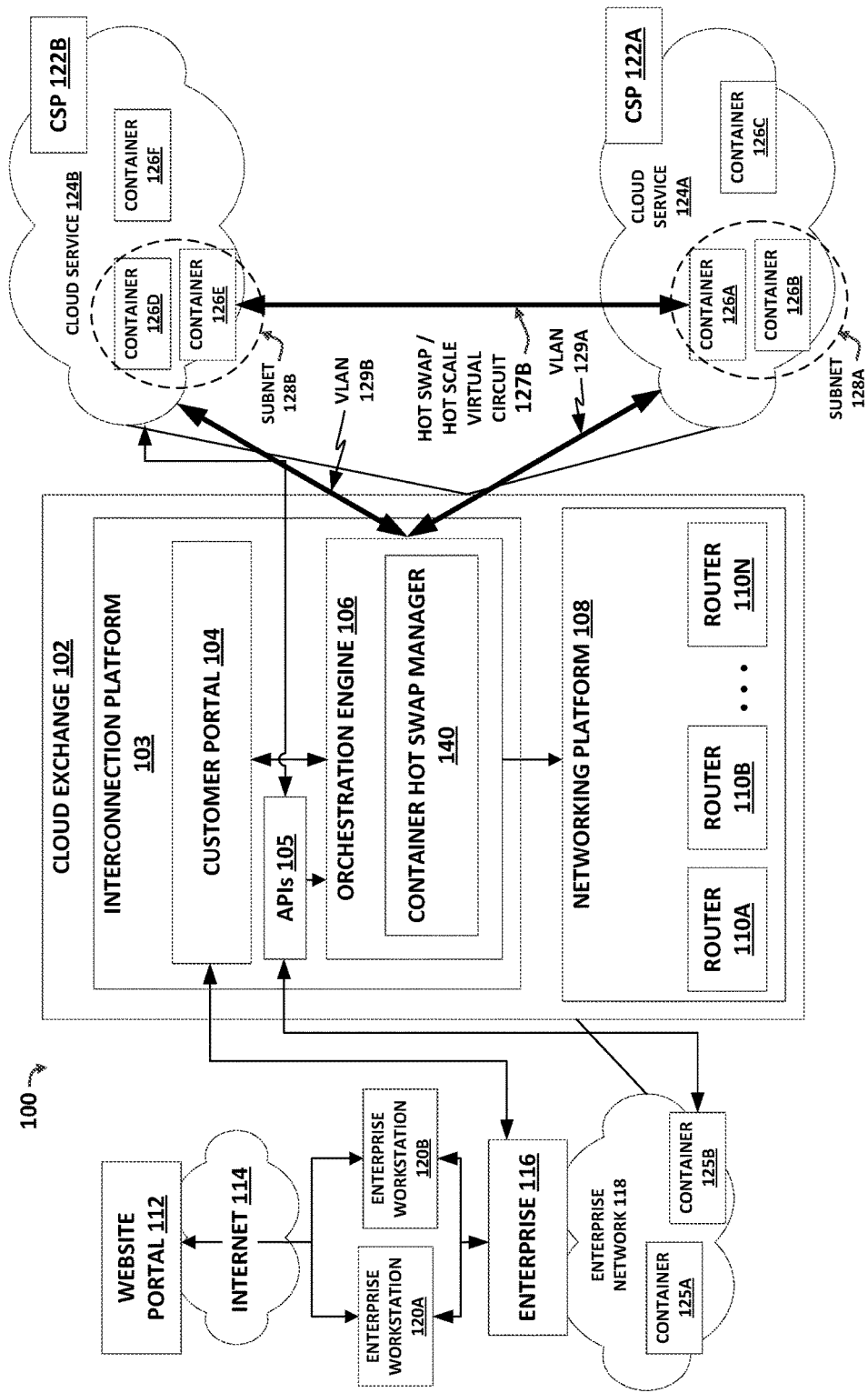
FIG. 2 is a block diagram illustrating an example network in accordance with example techniques of this disclosure.

FIG. 2 is a block diagram illustrating an example system in accordance with example techniques of this disclosure. As in FIG. 1, cloud exchange 102 may facilitate virtual connections for cloud services delivery with hot swap and hot scaling capability from multiple cloud service providers to one or more cloud service customers. Cloud exchange 102 includes orchestration engine 106 that performs hot swaps and hot scaling of containers and applications executing in the containers, particularly between containers of different CSPs, e.g., CSPs 122A, 122B. Orchestration engine 106 may enable cloud exchange 102 to operate connections, e.g., VLANs 129A, 129B, with CSPs 122A, 122B. Orchestration engine 106 may thereby implement a high-bandwidth virtual circuit 127B between CSPs 122A, 122B. Orchestration engine 106 may use virtual circuit 127B to facilitate hot swaps and hot scalings between the containers of CSPs 122A and 122B.

To implement communication between the containers of CSPs 122A and 122B, cloud exchange 102 may receive, from the respective CSP 122, for each container, a container identifier for identifying the container, and a network address for identifying a host executing the container. In one example, container 126A in CSP 122A may generate a data communication to be directed by cloud exchange 102 to container 126D in CSP 122B, such that the data communication has a particular container identifier and is executed by a particular host within cloud service 124B. This data communication may be forwarded as Layer 2 and/or Layer 3 (L2/L3) traffic by cloud service 124A to routers 110 of networking platform 108. Orchestration engine 106 may coordinate the operations of networking platform 108 such that routers 110 may forward the data communication to cloud service 124B, such that the data communication is directed to the host executing container 126D within cloud service 124B. In some examples, the cloud exchange 102 may switch traffic from container 126A in CSP 122A to container 126E in CSP 122B by changing the mapping between a cloud exchange address and container host addresses in the different CSPs 122A, 122B.

Containers 126 of the various CSPs 124 may register, via APIs 105, with orchestration engine 106 to provide respective container registration data including, e.g., host network address data and container identification data. The container registration data for a selected container, including a host network address for the container and a container identifier for the container, may also be referred to as a registration handle. Using the container registration data, orchestration engine 106 may facilitate inter-container communications and hot swap/hot scaling capability between containers 126 of the different CSPs 124, as well as potentially other functions such as a backup service, a disaster recovery service, and/or other services.

For example, orchestration engine 106 may send a container registration handle obtained from container 126A in CSP 122A to container 126E in CSP 122B. Orchestration engine 106, in conjunction with container 126A deployed to cloud service 124A, in this way extends network connectivity over the virtual circuit 127B from container 126A in CSP 122A to container 126E in CSP 122B and may enable CSP 122A to use the container registration handle of container 126A to directly address and send data to container 126E of CSP 122B via virtual circuit 127B. Likewise, orchestration engine 106 may, using the container registration handle of container 126A, enable directly addressing and sending data from container 126A in CSP 122A to container 126E in CSP 122B via virtual circuit 127B. In some examples in a hot swap or hot scaling process, orchestration engine 106 may indicate a URI of the second container 126E in association with the first container 126A, to implement redirecting all application traffic, data, or other interactions (in a hot swap) or at least some application traffic, data, or other interactions (in a hot scaling) addressed to the first container 126A to the second container 126E.

Using such extended network connectivity, cloud exchange 102 may in some instances facilitate hot swap and hot scaling functions for applications executed using containers 126 in CSPs 122A, 122B. For example, hot swap manager 140 of orchestration engine 106 may associate a first container 126A of cloud service 124A with a second container 126E of a different cloud service 124B, and cause first container 126A to communicate all or part of its application code, data, and state to second container 126E in the second CSP 122B for purposes of a hot swap or hot scaling. Hot swap manager 140 of orchestration engine 106 may associate or register the container registration handle for the second container 126E in the second CSP 122B with the first container 126A in the first CSP 122A via cloud exchange 102, such that interactions addressed to first container 126A in CSP 122A may be communicated to second container 126E in CSP 122B. In some examples, hot swap manager 140 may first identify a need, potential benefit, or fulfillment of a criterion for performing a hot swap or hot scaling of container 126A in first CSP 122A, and may then direct the creation of one or more new containers (potentially including second container 126E) in the different CSP 122B, before proceeding with a hot swap or hot scaling of container 126A to the new one or more containers in the second CSP 122B. Cloud exchange 106 may retrieve and temporarily store some or all of the code, data, and other state from container 126A in first CSP 122A, and deliver the code, data, and other state from container 126A to the new one or more containers (e.g., container 126E) in the second CSP 122B once the new one or more containers in the second CSP 122B are "spun up" or initiated and ready to commence functioning.

Hot swap manager 140 of orchestration engine 106 may thus swap the applications, runtime data, and other state from first container 126A in first CSP 122A to second container 126E in second CSP 122B, or scale the applications, runtime data, and other state from first container 126A in first CSP 122A across both first container 126A and container 126E in second CSP 122B, and potentially additional containers (e.g., containers 126D, 126F) in second CSP 122B. Hot swap manager 140 of orchestration engine 106 may thus swap or scale the applications, runtime data, and other state from first container 126A in first CSP 122A to one or more containers 126 in second CSP 122B while the applications continue running without interruption, and with necessary functions of the swapping or scaling performed by container hot swap manager 140 of orchestration engine 106. Orchestration engine 106 may thus hot swap and/or hot scale containerized applications across different CSPs to potentially reduce management of the swapping and/or scaling by the customer.

In some instances, a customer or other user, such as enterprise 116 or an agent thereof, may establish hot swap and hot scaling configuration settings or scheduling via customer portal 104. Hot swap manager 140 of orchestration engine 106 may then perform hot swaps or hot scaling in accordance with the customer-selected configuration settings or schedule, e.g., selected via customer portal 104. In some examples, orchestration engine 106 may detect that container 126A at CSP 122A has failed (e.g., due to a time-out or a software bug), and either customer-selected configuration settings or default settings may indicate for failed containers in a first CSP to be hot swapped to new containers in a second CSP. Some configuration settings or default settings may further include criteria for evaluating multiple container failures in one CSP, and criteria such that detecting signs of multiple failures in a first CSP triggers a hot swap or hot scaling from containers in the first CSP to containers in a different CSP. In these examples, hot swap manager 140 of orchestration engine 106 may then hot swap the failed container 125A or multiple failed containers in the first CSP to one or more new containers 126D-F at a second CSP 122B in accordance with the customer-selected configuration settings or the default settings.

In some examples, hot swap manager 140 may first direct the creation of one or more new containers 126D-F in a second CSP 122B to be able to hot swap one or more containers 126A-C in the first CSP 122A to the one or more new containers 126D-F in second CSP 122B. Orchestration engine 106 may then redirect application traffic from containers of first CSP 122A to corresponding hot swap or hot scaled containers in second CSP 122B, e.g., from container 126A in CSP 122A to container 126E in CSP 122B. For example, an API gateway that receives application requests for CSP 122A may be configured by orchestration engine 106 to redirect application traffic from container 126A to container 126E in CSP 122B, across virtual circuit 127B, in response to orchestration engine 106 determining that container 126A in CSP 122A has failed, or has become overloaded, or has met some other configured criterion indicating that container 126A would benefit from being hot swapped or hot scaled to a new container.

In other examples, orchestration engine 106 may detect that container 126A at CSP 122A is being overloaded by increased levels of application traffic, and either customer-selected configuration settings or default settings may indicate for overloaded containers in a first CSP to be hot scaled to new containers in a second CSP. In these examples, hot swap manager 140 of orchestration engine 106 may then direct orchestration engine 106 to hot scale the overloaded container 126A of CSP 122A to one or more additional containers in a different CSP 122B, such as new container 126E, in accordance with the customer-selected configuration settings or the default settings. In some examples, hot swap manager 140 may first direct the creation of one or more new containers at the second CSP 122B including container 126E to be able to hot scale container 126A in CSP 122A to the new containers in CSP 122B. Orchestration engine 106 may then redirect at least some application traffic from container 126A to the one or more new containers in CSP 122B including container 126E.

In some cases, hot swap manager 140 may copy and persist a state of container 126A to a container hot swap data store, e.g., by storing transactions or state data. As part of a hot swap or hot scaling function, hot swap manager 140 may push and copy the state of the first container 126A of the first CSP 122A to the second container of the second CSP 122B, e.g., container 126E, such that, e.g., second container 126E of second CSP 122B may take over and seamlessly transition execution of the applications from the first container 126A of first CSP 122A. In some examples, orchestration engine 106 may dynamically create virtual circuit 127B between first CSP 122A and second CSP 122B to enable communications between containers 126A-C executed by first CSP 122A and containers 126D-F executed by second CSP 122B. Although illustrated as a separate virtual circuit 127B, virtual circuit 127B may represent an extension of underlying virtual circuit elements (e.g., Virtual Local Area Networks (VLANs) 129A, 129B or an Internet Protocol-Virtual Private Network (IP-VPN) shared in common), thereby enabling containers 126A-C executed by first CSP 122A to exchange data with containers 126D-F executed by second CSP 122B as well as with orchestration engine 106.

In some examples, container hot swap manager 140 receives state from a primary container 126D executing in cloud service network 124B. The state is usable by container hot swap manager 140 to replicate, to another container, at least one of the operating environment provided by container 126D (e.g., a container image), one or more applications executed by the container 126D, a transaction being performed by the container 126D, and/or an operating state of the container 126D and the one or more applications. In some cases, container hot swap manager 140 may receive a container registration handle from the container 126D via APIs 105 and request state from the container 126D. In some cases, container 126D (e.g., using a network module described herein) sends the state to container hot swap manager 140 autonomously. In some cases, an application executed by container 126D or another container of cloud service 124B may send the state to container hot swap manager 140.

Container hot swap manager 140 may store the state to an in-memory data store or other database or data store of the cloud exchange 102. The database may include, for instance, a Redis data structure store. Container hot swap manager 140 may be configured to hot swap or hot scale a primary container 126D executing in cloud service provider network 122B to a cloud service provider network 122A. For example, an enterprise 116 may request, using customer portal 104 or via APIs 105, that cloud exchange 102 provide a hot swap or hot scaling service for container 126D using cloud service 124A. Customer portal 104 may present a portal interface by which enterprise 116 may configure identifying information for container 126D (e.g., a URI or container registration data as described herein) and also may select cloud service 124A to support the hot swap or hot scaling service.

In response to a hot swap or hot scaling event, container hot swap manager 140 "stands up," "spins up," or establishes a new secondary container 126A in cloud service 124A for primary container 126D in cloud service 124B to provide an operating platform for a workload previously being executed by primary container 126D. For example, container hot swap manager 140 may configure a new container in cloud service 124A. Container hot swap manager 140 may also use an existing container in cloud service 124A. In some cases, container 126A has registered a container registration handle with container hot swap manager 140. A hot swap or hot scaling event may include a request from enterprise 116, a message from container 126D indicating failure or overloading of the container 126D, a triggering of a policy rule of cloud exchange 102, or other event that causes container hot swap manager 140 to stand up a new secondary container to support primary container 126D.

To stand up the new secondary container 126A, container hot swap manager 140 sends state data from container 126D and stored by container hot swap manager 140 to container 126A, which uses the state data to replicate the operating environment of primary container 126D. As such, the operating environment of secondary container 126A may process workloads previously processed by primary container 126D.

Container hot swap manager 140 may configure network platform 108 to redirect workloads from enterprise 116, previously directed to primary container 126D, to secondary container 126A. Enterprise 116 may direct requests, via virtual circuit 127A configured in networking platform 108 (as shown in FIG. 1), to containers to execute a workload. Container hot swap manager 140 may configure routing information in routers 110 or network address translation (NAT) mapping in a NAT device (not shown) to cause requests directed for primary container 126A to be forwarded by network platform 108 to secondary container 126E. In some cases, e.g., a NAT mapping may be configured to cause the NAT device to rewrite a destination network address for packets that include a request from enterprise 116 to a network address of a host for secondary container 126E instead of a network address of a host for primary container 126A. In some cases, container host swap manager 140 may reconfigure a Domain Name Service (DNS) record to cause redirects of requests to secondary container 126E.

Secondary container 126E may satisfy the request and, if necessary, return results to enterprise 116 via virtual circuit 127A. In this way, hot swaps and hot scalings may be transparent to enterprise 116.

In some examples, enterprise 116 may purchase service licenses for cloud services 124 from CSPs 122. In some examples, each service license may grant enterprise 116 permission to register and deploy a number of containers on the cloud service provided by the CSP. For example, enterprise 116 may purchase a license to deploy fifty containers on cloud service 124A. Similarly, enterprise 116 may purchase a license to deploy twenty containers on cloud service 124B. Orchestration engine 106 may register the licenses enterprise 116 has to deploy the selected numbers of containers in each cloud service, and may perform hot swaps or hot scaling in the context of deploying, creating, and managing up to the selected numbers of containers in each of the cloud services 124.

Thus it may be seen that a system in accordance with example techniques of this disclosure may enable a cloud exchange to hot swap and hot scale containers within a private or public network or across different private or public cloud services or networks. Such a system in accordance with example techniques of this disclosure may direct workflows from a first container in a first CSP to one or more additional containers in a second CSP, either instead of or in addition to the first container, for hot swaps and hot scaling, respectively. Such a system in accordance with example techniques of this disclosure, e.g., a hot swap manager of an orchestration engine of a cloud exchange, may also in some cases store a unique container identifier for each container, and in some cases store a unique registration handle for each container that combines the network address and the unique container identifier for each container.

A system in accordance with example techniques of this disclosure may copy all of the state (for a hot swap) or a portion of the state (for a hot scaling) from the first container to the one or more additional containers, where the copied state may include any current instruction pointers, application data, application stack configuration data, microservice state, memory data, commands, process information, current data store pointers, and/or any other code, data, instruction pointers, or other state for one or more applications, a runtime, and any other resources executing in the first container, to the one or more additional containers. A system of this disclosure, e.g., an orchestration engine, may then cause application traffic bound for the original, primary, first container to be directed to the secondary swapped container or the scaled containers, such that the functions of the first container are performed by the swapped or scaled containers. Systems of this disclosure may thus enable cloud services to maintain more effective service to their customers by minimizing or quickly remedying interruptions to microservices or other applications provided by a particular container. Further, systems of this disclosure may further allow an enterprise using a cloud exchange to more effectively perform load balancing of the network, so as to avoid strain on one particular system, which may otherwise cause adverse performance and negatively impact the performance parameters or experience of the customer.

As one illustration of the techniques of the disclosure, an example Application Programming Interface (API) definition is provided for facilitating inter-container communications, via a cloud exchange, for containers executing at logically isolated networks. The following API is an example POST operation that, when executed by orchestration engine 106, provisions the virtual network for containers.

Request:
Request URI:
POST http://<HostName>/ecx/{version}/overlaynetwork
Filter Parameters:
None
Request Headers:

| Header Attribute | Description |
|---|---|
| Authorization | Required. Specifies the Oauth Bearer token |

Request Parameters:

name_services
  Description  Connection name
  Type  String
  Required  Yes
  Default  None
  Example  None -continued id
  Description  Connection ID
  Type  String
  Required  Yes
  Default
  Example  f7a6ae0574bbf62c42f539b50c8ebde0f728a253b6f
data center port
  Description  Connection type
  Type  String
  Default  None
  Example  ECX_Docker_Network
  Required  Yes
subnet
  Description  Subnet private IP details
  Type  String
  Default  None
  Example  172.17.0.1/16
  Required  No
gateway
  Description  Gateway private IP details
  Type  String
  Default  None
  Example  172.17.0.1
  Required  no
container_ID
  Description  Container ID
  Type  String
  Required  Yes
  Default  None
  Example  3386a527aa08b37eab05a6b775fba7ddd40d8f92c
container_name
  Description  Container name
  Type  String
  Required  Yes
  Default  None
  Example  container 1
provider
  Description  VLAN (Provider) name [may be expressed as a VLAN identifier/tag]
  Type  String
  Required  Yes
  Default  None
  Example  Azure Express Route, AWS Direct Connect, Cloud Sigma
speed
  Description  VLAN or connection speed
  Type  string
  Required  Yes
  Default  None
  Example  "up to 200, up to 500"
vlan
  Description  VLAN id for the connection
  Type  Number
  Required  Yes
  Default  None
  Example  456
code
  Description  Metro Code
  Type  String
  Required  Yes
  Default  None
  Example  SG
macAddress
  Description  MAC address
  Type  sting
  Required  Yes
  Default  None
  Example  02:42:ac:11:00:02
port
  Description  Docker port detail
  Type  Number
  Required  Yes
  Default  None
  Example  8082

-continued

```
ASN
    Description    Private ASN detail
    Type           Number
    Required       No
    Default        None
    Example        None
BGP
    Description    BGP connection details
    Type           Sting
    Required       Yes
    Default        None
    Example        None
```

Response:

```
HTTP/1.1 200 OK
Content-Type: application/json
{[
    {
        "Name": "Docker Virtual Network",
        "Id": "f7a6ae0574bbf62c42f539b50c8ebde0f728a253b6f",
        "driver" : "ECX_Docker_Network",
        "AuthKey" : "12345ctyur569jfh"
        "IPAM": {
            "driver": "default",
            "Config": [
                {
                    "Subnet": "172.17.0.1/16", "172.1.0.2/16"
                    "Gateway": "172.17.0.1"
                }
            ]
        },
        "Containers": [{
            "Id":"3386a527aa08b37eab05a6b775fba7ddd40d8f92c",
            "Name" :"container1",
            "Provider" : "Azure"
            "EndpointID": "647c12443e91f642abb60",
            "Vlan":"102"
            "vlanSpeed": "1gpbs"
            "MacAddress": "02:42:ac:11:00:02",
            "IPv4Address": "172.17.0.2/16",
            "IPv6Address": "",
            "BGP" : "",
            "ASN" : "",
            "Port" : "8090"
        },
        {
            "Id":" d40d8f92c3a6b775fba7dd386a527aa08b37eab05",
            "Name" :"container2",
            "Provider" : "AWS"
            "EndpointID": "647c12443e91f642abb60dfab",
            "Vlan":"103",
            "vlanSpeed" : "1gpbs",
            "MacAddress": "02:42:ac:11:00:FF02",
            "IPv4Address": "172.1.0.2/16",
            "IPv6Address": "",
            "BGP" : "",
            "ASN" : "",
            "Port" : "8091"
        }
        ],
        "Options": {
            "default_bridge": "true",
            "enable_icc": "true",
            "MD5": "true",
            "data center port": "9001"   // E.g., connect Enterprise to Cloud
                                         // Exchange networking platform
        }
    }
]
```

In the above example API, the request is an HTTP POST command to a uniform resource identifier (URI) that is an API 105 interface for provisioning virtual networks for containers. The body of the message contains one or more request parameters that specify the configuration options for the virtual network for containers. In one example, an administrator of enterprise 116 accesses customer portal 104 to access APIs 105 which transmit the request to orchestration engine 106 to request provisioning of a virtual network for containers. In another example, the administrator of enterprise 116 accesses APIs 105 directly to transmit the request to orchestration engine 106 to request provisioning of a virtual network for containers. In response to receiving the request URI, the orchestration engine 106 provisions a virtual network for containers. Further, the orchestration engine 106 transmits a response message, as depicted above, to enterprise 116 that indicates the successful provisioning of the virtual network as well as the specific configuration details for the provisioned virtual network. The body of the example Response provided above may be similar to the body of an example request, as provided above.

In another example, an administrator of enterprise 116 accesses APIs 105, either through customer portal 104 or directly, to establish configuration settings, such as detection and performance criteria, for triggering and performing hot swaps and/or hot scaling of containers. In another example in which container 126A in cloud service 124A has been hot swapped with container 126E in cloud service 124B, orchestration engine 106 may configure an API gateway to redirect application requests or other cloud service traffic from enterprise network 118 for resources in container 126A to container 126E, either across virtual circuit 127B from cloud service 124A or via VLAN 129B from cloud exchange 102.

In the above example API, the "name services" parameter specifies the connection name. This parameter is provided as a string. In the above example response, the "name services" parameter has set the name of the virtual network to be "Docker Virtual Network."

In the above example API, the "id" parameter specifies an identifier for the virtual network. In an example where enterprise 116 or orchestration engine 106 access multiple virtual networks, enterprise 116 and orchestration engine 106 may use the identification tag parameter to distinguish the origin of network traffic received from each virtual network.

In the example above API, the "driver" parameter indicates the type of connection being requested, here, a "ECX_Docker_Network" to indicate a virtual network for containers, in accordance with techniques described herein.

In the above example API, the "data center port" parameter in the options substructure specifies a data port through which enterprise 116 communicates with the virtual network. This parameter may be an integer specifying the actual port of the cloud exchange (e.g., "9001"), where the port represents an interface port of a switch or panel for accessing the cloud exchange networking platform 108.

In the above example API, the "subnet" parameter specifies a subnet of containers on a CSP. For example, and with reference to FIG. 1, the "subnet" parameter may specific a subnet 128A on CSP 122A that includes containers 126A-126B. Each subnet is specific to a particular CSP 122, and each subnet 128 may contain one or more containers 126 executing on hosts within the CSP 122. However, a virtual network as described herein multiple subnets belonging to different CSPs. For example, a single virtual network may include both subnet 128A of CSP 122A and subnet 128B of CSP 122B.

In the above example API, the "gateway" parameter specifies an address of a gateway or edge router of enterprise 116 that exists between the enterprise network 118 and the cloud exchange 102. Orchestration engine 106 routes traffic destined to enterprise 116 from the virtual network to this gateway address.

The following parameters may be included in descriptive data for containers, as a structured container object in a list of "Containers." Description data for containers may represent container registration data.

In the above example API, the "container_ID" parameter specifies a unique identifier for a provisioned container. Enterprise 116, orchestration engine 106, CSPs 122, and other containers 126 may use the container ID to communicate with, manage, or configure the corresponding container.

In the above example API, the "container_name" parameter specifies a human-readable name for a provisioned container. Enterprise 116, orchestration engine 106, CSPs 122, and other containers 126 may use the container ID to communicate with, manage, or configure the corresponding container.

In the above example API, the "provider" parameter specifies a CSP 122 for hosting a container requested to be provisioned by enterprise 116. In some examples, the provider is specified to be one of Azure Express Route, AWS Direct Connect, Cloud Sigma, and the like.

In the above example API, the "speed" parameter specifies a connection speed for the virtual network. In some examples, the "speed" parameter sets a maximum connection speed for the network.

In the above example API, the "vlan" parameter specifies a vlan identifier for enterprise 116. In some examples, orchestration engine 116 and CSPs 122 use the vlan identifier to route traffic exchanged between enterprise 116 and CSPs 122.

In the above example API, the "code" parameter specifies a region for the virtual network. In the above example, the "code" parameter "SG" specifies that the virtual network is to be provisioned in the Singapore region. In other examples, the "code" parameter specifies a city, zip code, county, state, province, country, or continent.

In the above example API, the "macAddress" parameter describes a MAC address for a host of a container. For example, enterprise 116 may use this parameter to request the MAC address for a host of a container. One of orchestration engine 106 or CSP 122 responds by providing the requested MAC address.

In the above example API, the "port" parameter describes a port for a container. In some examples, each container 126 executes on a host. For example, with reference to FIG. 3, each container 306 executing on host 304 may have a unique host address+port combination or a unique network prefix/subnet+port combination that identifies the container in the cloud service provider network. Enterprise 116 may use this parameter to specify the port for a specific container. Alternatively, enterprise 116 may use this parameter to request the port for a specific container. One of orchestration engine 106 or CSP 122 responds by providing the requested port of the container.

In the above example API, the "ASN" and "BGP" parameters specify ASN and BGP parameters that the orchestration engine 106 should use for facilitating traffic between enterprise 116 and the provisioned virtual network.

The parameters specified in the above example API are for illustrative purposes only. The techniques of the disclosure may be implemented using the example API provided above, or with different parameters not expressly disclosed herein. For example, the techniques of the disclosure may be implemented using only a subset of the parameters described above, or may provision the virtual network for containers or perform hot swaps or hot scaling without using any of the parameters described above. Nothing in this disclosure should be construed so as to limit the techniques of this disclosure to the example API illustrated above. Specific techniques for the design and implementation of a virtual network for containers are described in U.S. Provisional Application No. 62/286,259 and U.S. patent application Ser. No. 15/228,471, the entire contents of both of which are incorporated by reference herein.

Figure 3:
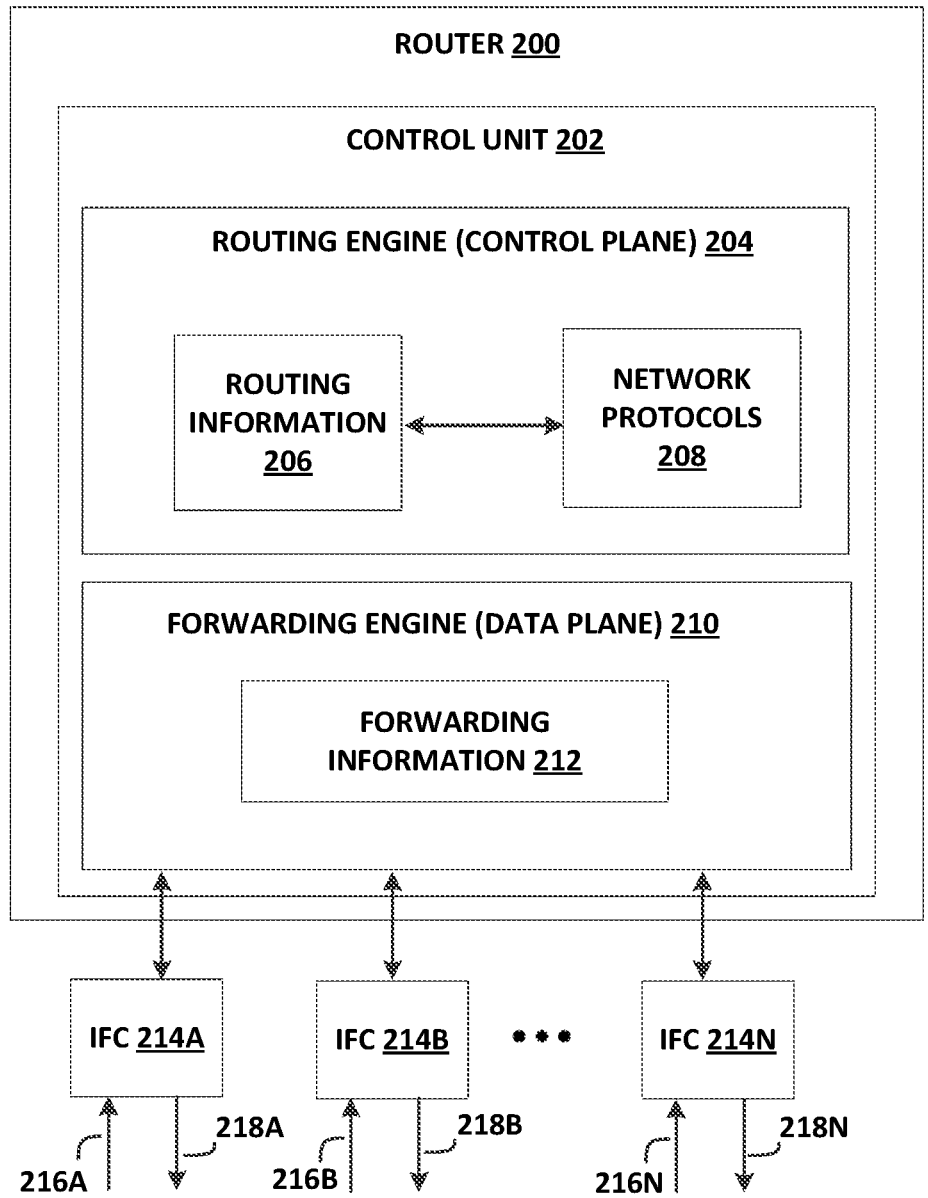
FIG. 3 is a block diagram illustrating an example router in accordance with example techniques of this disclosure.

FIG. 3 is a block diagram illustrating an example router within a cloud exchange in accordance with one or more techniques of the disclosure. In general, router 200 may operate substantially similarly to routers 110A-110N in FIG. 1. In this example, router 200 includes interface cards 214A-214N ("IFCs 214") that may receive packets via incoming links 216A-216N ("incoming links 216") and send packets via outbound links 218A-218N ("outbound links 218"). IFCs 214 are typically coupled to links 216, 218 via a number of interface ports. Router 200 also includes a control unit 202 that determines routes of received packets and forwards the packets accordingly via IFCs 214.

Control unit 202 may comprise a routing engine 204 and a packet forwarding engine 210. Routing engine 204 operates as the control plane for router 200 and includes an operating system that provides a multi-tasking operating environment for execution of a number of concurrent processes. Routing engine 204, for example, may execute software instructions to implement one or more network protocols 208. For example, network protocols 208 may include one or more routing and switching protocols, such as Border Gateway Protocol (BGP), Multi-protocol Label Switching (MPLS), Virtual Private LAN Services (VPLS), Ethernet Virtual Private Networking (EVPN), or Provider Backbone Bridging EVPN (PBB-EVPN) for exchanging routing information with other routing devices and for updating routing information 206. Routing information 206 may describe a topology of the cloud exchange in which router 200 resides, and may also include routes through the shared trees in the computer network. Routing information 206 describes various routes within the computer network, and the appropriate next hops for each route, i.e., the neighboring routing devices along each of the routes. Routing engine 204 analyzes stored routing information 206 and generates forwarding information 212 for forwarding engine 210. Forwarding information 212 may associate, for example, network destinations for certain multicast groups with specific next hops and corresponding IFCs 214 and physical output ports for output links 218. Forwarding information 212 may be a radix tree programmed into dedicated forwarding chips, a series of tables, a complex database, a link list, a radix tree, a database, a flat file, or any of various other data structures.

Forwarding information 212 may include lookup structures. Lookup structures may, given a key, such as an address, provide one or more values. In some examples, the one or more values may be one or more next hops. A next hop may be implemented as microcode, which, when executed, performs one or more operations. One or more next hops may be "chained," such that a set of chained next hops performs a set of operations for respective different next hops when executed. Examples of such operations may include applying one or more services to a packet, dropping a packet, and/or forwarding a packet using an interface identified by the one or more next hops. Router 200 may be configured, at least in part, by interconnection platform 103 as shown in FIGS. 1 and 2, including by container hot swap manager 140.

In accordance with techniques of this disclosure, router 200 may operate as one of routers 110 in the example of FIGS. 1 and 2. In one example, routing engine 204 may use routing protocols 208 to exchange routing information with each of a plurality of cloud services (e.g., cloud services 124) and store learned routes through cloud services 124 in routing information 206. Forwarding engine 210 may associate various subnets, such as subnets 128A and 128B, with various cloud services, such as cloud services 124A and 124B, respectively, and store this information in forwarding information 212. Router 200 may receive an L2/L3 data communication, which may, for example, originate from container 126A and be addressed for container 126D, along incoming links 216. Control unit 202 may parse the data communication for a network address (e.g., IP address) within subnet 128B and, based on forwarding information 212, forward the data communication toward subnet 128B, wherein container 126D may receive the forwarded communication. The network address may be associated with a first container that hot swap manager 140 has hot swapped or hot scaled, such that the network address is now associated with one or more additional containers, instead of or in addition to the original container. Hot swap manager 140 may also configure control unit 202 to address data communications to unique container identifications associated with a network address, such as in cases where alternative or additional containers (for hot swaps and hot scalings, respectively) have been assigned to the same network address as a first container. Forwarding engine 210 may transmit the data communication along outbound links 218 to subnet 128B within cloud service 124B, wherein container 126D may receive the data communication.

Accordingly, it may be seen that a router within a cloud exchange implemented according to techniques of this disclosure may receive a data communication from a first container within a first private network and transmit that data communication to one or more second containers which may be within the same first private network, within a second private network, or in a public cloud services network. Such a router may allow a container to exchange data between microservices or other applications executing on containers on the same or different private or public networks. Further, such a router may allow a private network to maintain more effective service to their customers by minimizing or remedying interruptions to a microservice or other application provided by a particular container. Further, such a router may allow a private network to more effectively perform load balancing of the network, so as to avoid strain on one particular system, which may otherwise cause adverse performance and negatively impact the performance parameters or experience of the customer.

The architecture of router 200 illustrated in FIG. 3 is shown for example purposes only. Techniques as set forth in this disclosure may be implemented in the example router of FIG. 3 as well as other types of routers not described specifically herein. In other examples, routers enabled to function in accordance with this disclosure may be configured in a variety of ways. In some examples, some of the functionality of control unit 202 may be distributed within IFCs 214. In some examples, control unit 202 may comprise a plurality of packet forwarding engines. Nothing in this disclosure should be construed so as to limit techniques of this disclosure to the example architecture illustrated by FIG. 3.

Figure 4:
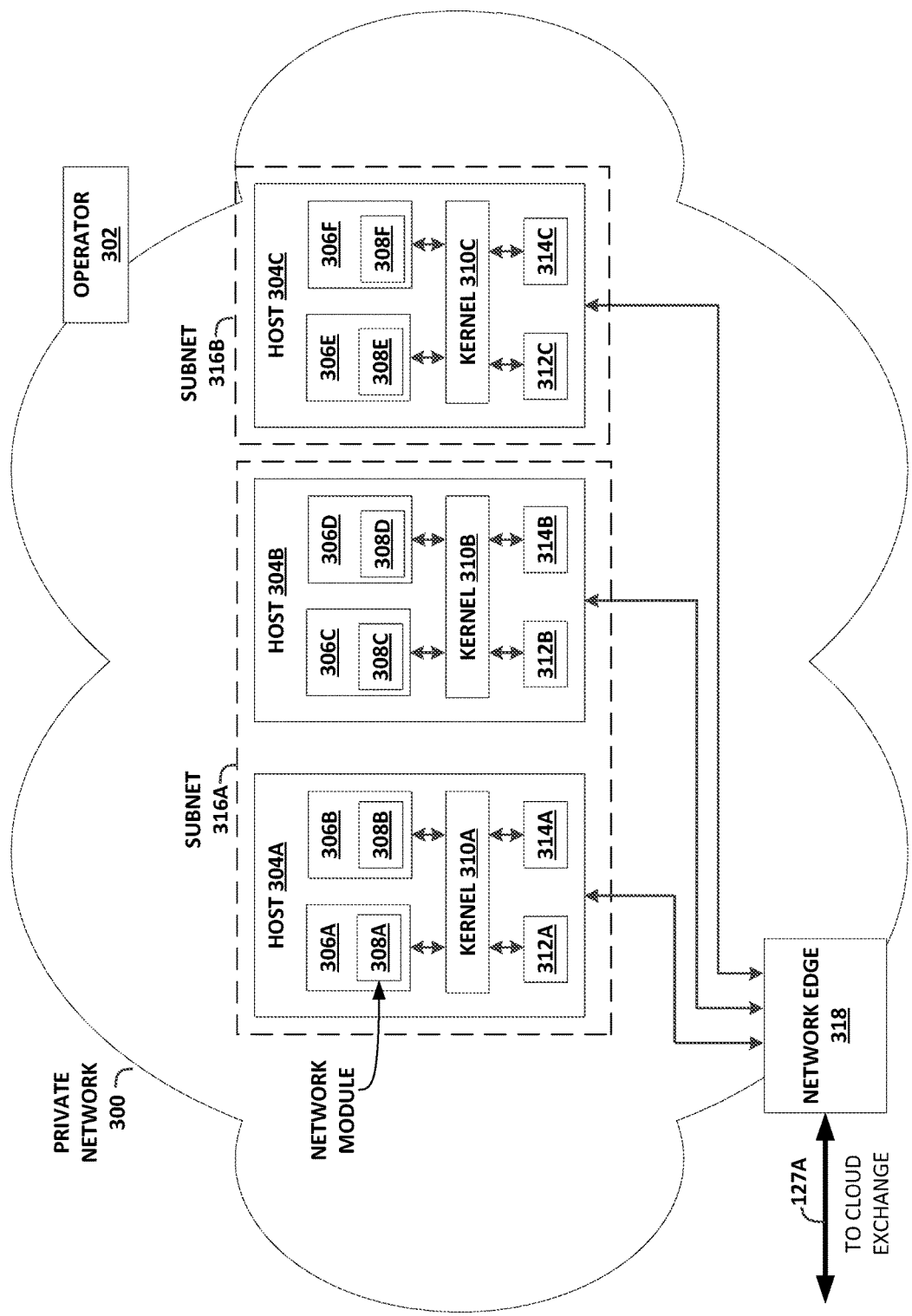
FIG. 4 is a block diagram illustrating an example private network in accordance with example techniques of this disclosure.

FIG. 4 is a block diagram illustrating an example private network configured in accordance with example techniques of this disclosure. In the example of FIG. 4, operator 302 may operate a private network 300 possessing computing resources by which one or more customers may execute a plurality of applications and microservices. In some examples, operator 302 may be an enterprise, such as enterprise 116 of FIGS. 1 and 2. In some examples, operator 302 may be a CSP, such as an operator for any of CSP 122A or CSP 122B of FIGS. 1 and 2. In some examples, private network 300 may be an enterprise network, such as enterprise network 118 of FIGS. 1 and 2. In some examples, private network 300 may be a cloud service, such as cloud service 124A or 124B of FIGS. 1 and 2. Private network 300 may comprise a plurality of hosts 304A, 304B, and 304C (collectively, "hosts 304"). In some examples, a host may be a server running on private network 300. In other examples, one or more hosts may be one or more virtual machines executed on one or more servers running on private network 300. Each of hosts 304 may have an IP address such that the host may be identified on private network 300. In some examples, a plurality of hosts may possess a plurality of IP addresses falling within an IP subnet, such as IP subnets 316A, 316B. Hosts 304 may communicate with network edge device 318, which may represent a router or L3 switch. Network edge device 318 may connect along virtual circuit 127A to a cloud exchange, such as cloud exchange 102 of FIGS. 1 and 2. In some examples, network edge router 318 may operate to forward messages between hosts 304 and cloud exchange 102.

Each host may execute one or more containers. In the example of FIG. 4, host 304A is configured to execute containers 306A and 306B, host 306B is configured to execute containers 306C and 306D, and host 304C is configured to execute containers 306E and 306F (collectively, "containers 306"). Containers 306 may operate in a similar fashion as and may represent any of containers 125 and 126 of FIGS. 1 and 2. Each host 304 may implement a specific kernel instance 310, common libraries 312, and kernel specific libraries 314. Each of the containers executed within a particular host share a kernel 310 and common libraries 312 (e.g., containers 306A and 306B of host 304A share kernel 310A and common libraries 312A). In one example, any of hosts 304 may execute the Docker container application for the Linux operating system, which in such examples are represented by containers 306 and kernel 310, respectively.

In some examples, each of the containers within the host may share the IP address of the host. In some examples, each container may be uniquely identified by a container ID or port ID. In some examples, the port ID of a container identifies a Transmission Control Protocol (TCP) port or a User Datagram Protocol (UDP) port. In the example of FIG. 4, containers 306A and 306B may share IP address 192.168.1.125 with host 304A. In this example, container 306A may be associated with port ID 5001 for the host 304A while container 306B may be associated with port ID 5002. In some examples, host 304A may forward traffic destined for TCP port 5001 to container 306A and forward traffic destined for TCP port 5002 to container 306B. According to example techniques of this disclosure, each of containers 306 may possess a network module 308, as described herein, to allow the container to communicate with cloud exchange 102. Orchestration engine 106 may communicate data for the network modules 308 to containers 306 to enable such responsive interaction of containers 306 with cloud exchange 102, and with container hot swap manager 140 in particular.

In some examples, an enterprise, such as enterprise 116 of FIGS. 1 and 2, may purchase or otherwise contract for a number of containers to be deployed within a cloud service, such as cloud service 124A. In some examples, enterprise 116 may create at least one application, such as a microservice. Each of containers 306 may provide an execution environment for the applications. In some examples, each of containers 306 may provide an execution environment for at least one unique application or microservice, while in other examples, each of containers 306 may provide redundant access to at least one application or microservice. In some examples, each customer of private network 300 may access a single container (e.g., container 306A). In some examples, a customer may have access to a plurality of containers (e.g., containers 306A, 306B, and 306C). In some examples, each container within a subnet may provide a particular suite of applications or microservices. In some examples, each container within a subnet may provide access to private network 300 to a particular customer or group of customers.

According to example techniques of this disclosure, containers 306 include respective network modules 308 extended to obtain and send, to a cloud exchange, container registration data including, e.g., network data and container identification data for the container. For example, container 306A includes network module 308A that obtains a network address for host 304A in subnet 316A and further obtains a container identifier for container 306A, the container identifier usable by the kernel 310A to identify container 306A from other containers executing on host 307A, such as container 306B. In some cases, the container identifier is a unique container identifier that distinguishes container 306A from all other containers in private network 300. In some cases, the container identifier is a networking port, such as a TCP or UDP port, that distinguishes container 306A from other containers executing on the host. In some cases, the container identification data includes both a unique container identifier and a networking port. In any of these cases, a unique container identifier and/or a networking port assigned to a particular container may be referred to generally as a container identifier.

Network modules 308 self-register the container registration data by invoking APIs 105 of cloud exchange 102 to send the container registration data. In this way, interconnection platform 103 of cloud exchange 102 receives container registration data by which interconnection platform 103 may, via a virtual circuit, send data communications to the corresponding container 306. For example with respect to container 306A, network module 308A may invoke APIs 105, via a virtual circuit 127A with cloud exchange 102, to send the container registration data for container 306A to interconnection platform 103.

Interconnection platform 103 may store container registration data for containers 306. Interconnection platform 103 may associate multiple containers in an association and send each container in the association container registration data for other containers in the association. As a result, a container in an association may use the container registration data to send data communications via a cloud exchange to another container in the association that is located in a different private network coupled to the cloud exchange.

According to example techniques of this disclosure, container 306A within private network 300 may communicate with a container within another private network connected to cloud exchange 102, such as container 126E within cloud service 124B. In this example, based on container registration data received from interconnection platform 103, container 306A may generate a data communication having a container identifier (e.g., a port) indicating the destination container (e.g., container 126E) and a network address (e.g., an IP address within a subnet 128B of CSP 122B) for a host that executes the destination container. Container 306A may output this data communication for transmission outside private network 300 via virtual circuit 127B to routers 110 of cloud exchange 102. As described above, orchestration engine 106 may operate networking platform 108 to forward the communication to the destination subnet of the appropriate cloud service (e.g., to subnet 128B of cloud service 124B). Cloud service 124B may direct the data communication to container 126E within subnet 128B. If container 126E responds with a second data communication, cloud service 124B may pass the second data communication to routers 110 of cloud exchange 102. Cloud exchange 102 may include networking platform 108 to redirect the second data communication to private network 300 along a communication link such as virtual circuit 127B.

Network edge device 318 may receive the second data communication from virtual circuit 127A/127B and forward the data communication to the host having the IP address identified by the data communication (e.g., host 304A). In some examples, the destination IP address of second data communication may specify a TCP/UDP port of host 304A. Host 304A may pass the second data communication to the container having a port ID matching the TCP/UDP port of the destination IP address. Thus, it may be seen that a private network implemented according to example techniques of this disclosure may enable communication between a first container within a first private network connected to a cloud exchange and a second container within a second private network connected to the cloud exchange.

In some examples, container 306A may generate and send data representing a state of the container 306A to a cloud exchange for hot swapping or hot scaling using network module 308A.

The architecture of private network 300 illustrated in FIG. 4 is shown for example purposes only. Example techniques of this disclosure may be implemented in the example cloud service of FIG. 4, as well as other types of cloud services not described specifically herein. In other examples, private network 300 may be configured in a variety of ways. In some examples, private network 300 may implement various APIs, operating systems, hardware, or software that share a common communication protocol with the cloud exchange. In some examples, each cloud service of the cloud exchange may use a different communication protocol to exchange data with the cloud exchange, and the cloud exchange may act to facilitate or translate communications between cloud services using different communication protocols. Nothing in this disclosure should be construed so as to limit techniques of this disclosure to the example architecture illustrated by FIG. 4.

Figure 5:
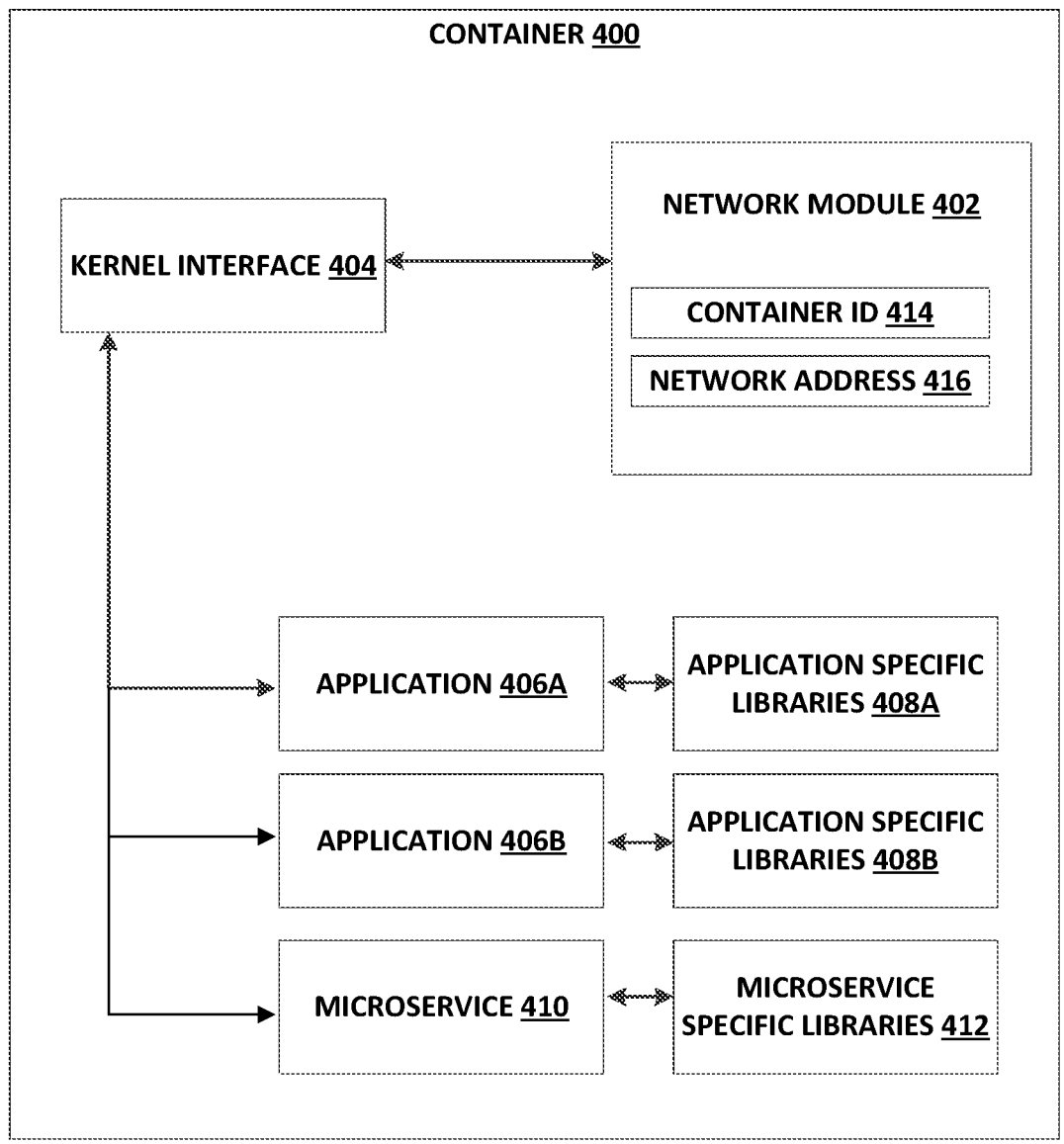
FIG. 5 is a block diagram illustrating an example container in accordance with example techniques of this disclosure.

FIG. 5 is a block diagram illustrating an example container according to example techniques of this disclosure. Container 400 may be a virtualized container such as those provided by the Docker container technology for the Linux operating system. In some examples, container 400 may share an operating system and common libraries with other containers and the host kernel. In some examples, container 400 may send and receive data communications, control signals, and various other transmissions to and from the system kernel through kernel interface 404.

In some examples, container 400 may use network module 402 in conjunction with kernel interface 404 to compose, send, and receive data to and from a network. For example, network module 402 may enable container 400 to communicate according to various networking protocols, such as Virtual Extensible LAN (VXLAN), IPVLAN, MACVLAN, VPLS, EVPN, or PBB-EVPN. According to example techniques of this disclosure, network module 402 may operate to self-register the corresponding container of a plurality of containers, operating within a plurality of networks coupled to a cloud exchange, with the cloud exchange to facilitate communications among the containers via the cloud exchange. Network module 402 includes several identifiers so that container 400 may be identified on a private network, such as a cloud service or enterprise network. Container identifier 414 is a data field that uniquely identifies container 400 against other containers. In some examples, container identifier 414 is a port ID that corresponds to a TCP/UDP port of the host computer executing container 400. Host network address 416 is a data field that identifies the network address of the host on which container 400 executes. In some examples, host network address 416 may be an IP address. In various examples, host network address 416 may generally be a Uniform Resource Identifier (URI).

In some examples, container 400 is configured to execute at least one microservice 410 and associated microservice-specific libraries 412. In some examples, container 400 is configured to execute at least one application and associated application-specific libraries, such as application 406A and 406B and application-specific libraries 408A and 408B, respectively. Container 400 may provide the at least one microservices and applications to a customer for access through a cloud service. Because container 400 is virtualized and isolated from the system kernel and other containers, container 400 may provide a customer with safe and secure access to the at least one microservices and applications. In some examples, container 400 may be a container within a Microsoft Azure cloud service. In these examples, container 400 may provide a customer with an environment to execute a suite of applications. In some examples, container 400 may be a container within an Amazon Web Services cloud service. In these examples, container 400 may provide a customer with an environment to execute one or more microservices.

The architecture of container 400 illustrated in FIG. 5 is shown for example purposes only. Example techniques as set forth in this disclosure may be implemented in the example container of FIG. 5, as well as other types of containers not described specifically herein. In various examples, container 400 may be configured in a variety of ways. In some examples, container 400 may implement various APIs, one or more applications, or one or more microservices. In some examples, container 400 may implement a single application or a single microservice. Nothing in this disclosure should be construed so as to limit techniques of this disclosure to the example architecture illustrated by FIG. 5.

Figure 6:
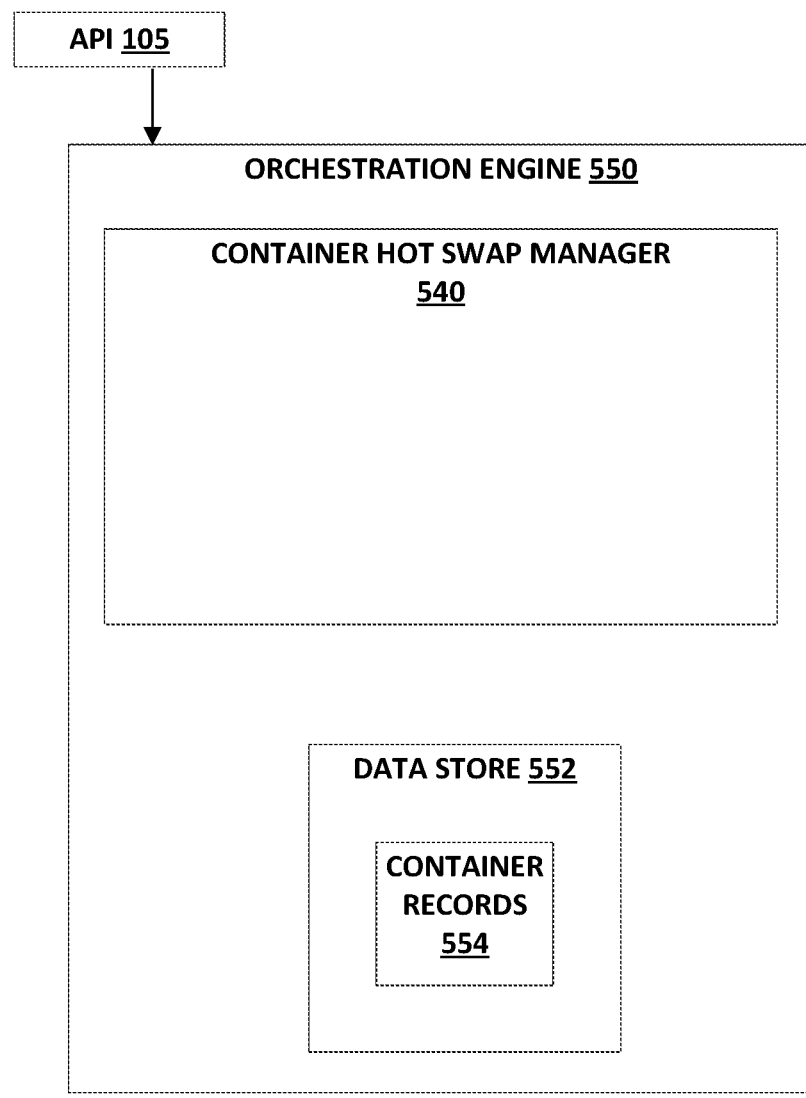
FIG. 6 is a block diagram illustrating an orchestration engine for a cloud exchange in accordance with example techniques of this disclosure.

FIG. 6 is a block diagram illustrating an orchestration engine for a cloud exchange according to techniques described in this disclosure. Orchestration engine 550 may represent an example instance of orchestration engine 106 of FIGS. 1 and 2. While FIG. 6 is described with reference to FIGS. 1 and 2, FIG. 6 may apply generally to various techniques of this disclosure.

Orchestration engine 550 receives, via APIs 105, container registration data from containers executing in private networks (e.g., enterprise and CSP networks) coupled to a cloud exchange (e.g., cloud exchange 102 of FIGS. 1 and 2) managed at least in part by an interconnection platform that includes the orchestration engine 550. Orchestration engine 550 stores, to a database or other data store 552, container records 554 having entries for respective containers and including corresponding container registration data for containers. The container registration data may include a respective container registration handle for each available container, where each container registration handle includes both a network address and a unique container identifier (potentially a port number) for the respective container. Orchestration engine 550 may use container registration data to extend network connectivity through the private network that includes a container and address the container directly via a virtual circuit by which the private network communicate with the cloud exchange and, in some cases, other private networks. Container hot swap manager 540, which may be an implementation corresponding to container hot swap manager 140 of FIGS. 1 and 2, may modify the container registration handles in container data store 552 to assign the network address of a first container to one or more second, alternative containers, in the case of performing a hot swap. Container hot swap manager 540 may modify the container registration handles in container data store 552 to assign the network address of a first container to one or more second, additional containers, in the case of performing a hot scaling.

In some examples, container hot swap manager 540 may also copy state from a first container in a first CSP, and store the container's state in data store 552 before or in parallel with sending the state to one or more containers in a second CSP. Hot swap manager 540 may store the state more or less temporarily in some examples to ensure that the state is preserved before sending the state to the new one or more containers in the new CSP and confirming with the second CSP that the state has been successfully written to the new one or more containers and is being used for execution by the one or more new containers without any loss of state from the original container in the first CSP after the hot swap or hot scaling process.

Orchestration engine 550 may create an association between containers owned by, licensed to, and/or accessible to an enterprise but operating in different private networks (e.g., an enterprise network and one or more cloud service networks). Based on a network address for a container and an IP subnet identified by a service key, orchestration engine 550 may correlate a service key to a container executing at a cloud service network to associate the container to an enterprise that provided the service key. In this way, the container is registered to the enterprise in orchestration engine 550.

Orchestration engine 550 may establish a virtual circuit between an enterprise network and the cloud service network. Containers may provide their corresponding container registration data to orchestration engine 550 via the virtual circuit (e.g., one or more VLANs). Orchestration engine 550 may in some cases provide the container registration data to the enterprise such that containers executing at the enterprise network may address containers in the cloud service network using a container host network address and container port/identifier, via the virtual circuit.

Container hot swap manager 540 may be vendor-neutral in that the cloud exchange provider may implement container hot swap manager 540 in conjunction with any of a plurality of cloud service providers selectable by the enterprise. In some cases, orchestration engine 550 may independently deploy containers to cloud services in order to facilitate the back-end setup for container hot swap manager 540.

For container hot swap manager 540, the enterprise operator may create an association between containers. The enterprise operator may access a list of containers for the enterprise and a list of containers for various cloud services, create associations between containers from the different lists, and configure settings or schedules for hot swaps and hot scalings between containers in different cloud services. For instance, the enterprise operator may specify container 126E in a second cloud service is a replica of container 126A in a first cloud service. In some cases, containers accessible via a particular virtual circuit may be automatically associated by orchestration engine 550. Having been associated, orchestration engine 550 then provides the container registration data for a container to associated containers to enable the associated containers to address data communications to the container for hot swaps or hot scalings of the containers.

In various examples, container hot swap manager 540 may store hot swap and hot scaling configuration settings for particular containers. When container hot swap manager 540 detects that specific criteria have been met or triggered for a hot swap of a first container in a first CSP, container hot swap manager 540 may copy all of the state from the first container, stand up a new container in a second CSP if needed, send the state from the first container in the first CSP to the second container in the second CSP, and confirm that the second container in the second CSP is executing with the state from the first container. In some examples, container hot swap manager 540 may store the state in an internal data store 552 of orchestration engine 550 during at least part of the hot swap process. When container hot swap manager 540 detects that specific criteria have been met or triggered for a hot scaling of a first container in a first CSP, container hot swap manager 540 may copy all of the state from the first container, stand up one or multiple new containers in a second CSP if needed, send at least some of the state from the first container in the first CSP to the one or multiple containers in the second CSP, and confirm that the one or multiple containers in the second CSP are executing with the at least part of the state from the first container.

Figure 7:
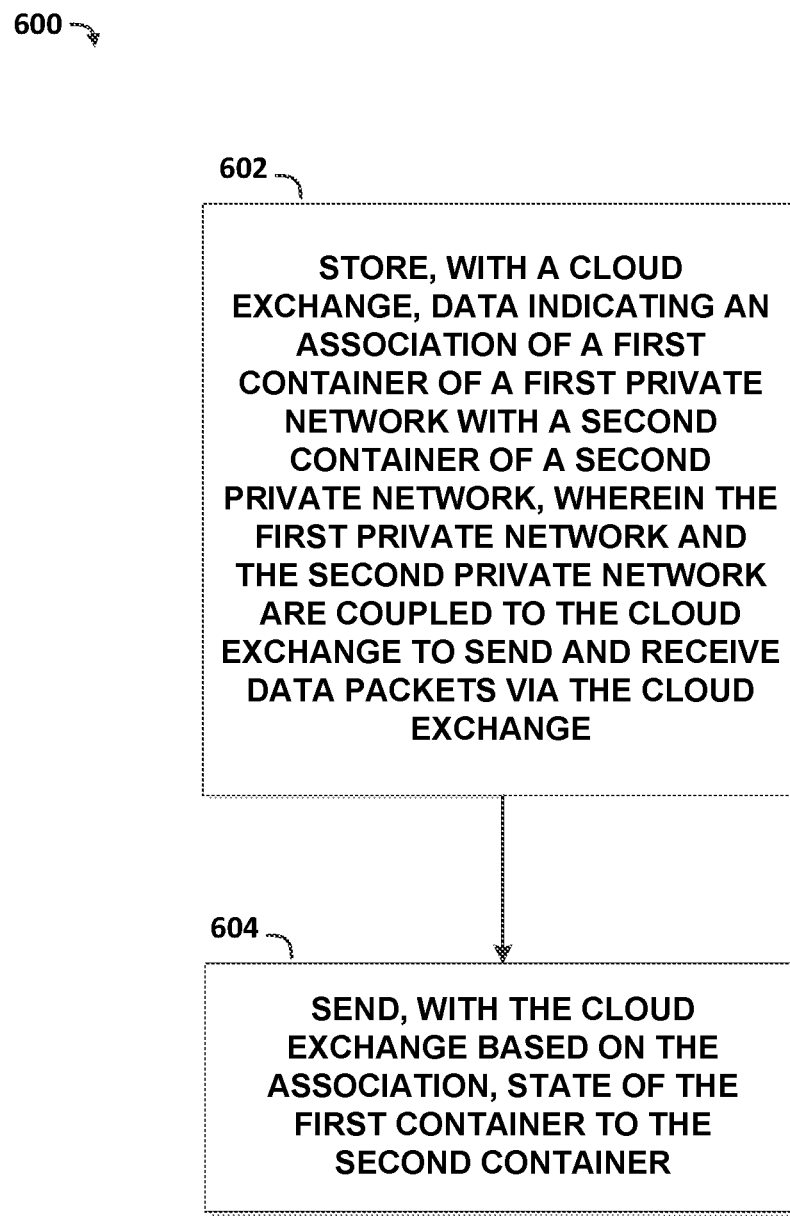
FIG. 7 is a flowchart illustrating an example method in accordance with example techniques of this disclosure.

FIG. 7 is a flowchart illustrating an example method according to techniques of this disclosure. FIG. 7 is described with reference to FIGS. 1 and 2; however, FIG. 7 may apply generally to any of various techniques of this disclosure. In some examples, a cloud exchange (e.g., cloud exchange 102, and in some particular examples, container hot swap manager 140 of orchestration engine 103 of cloud exchange 102) may store data indicating an association of a first container of a first private network with a second container of a second private network (e.g., container 126A of CSP 122A, container 126E of CSP 122B), wherein the first private network and the second private network are coupled to the cloud exchange to send and receive data packets via the cloud exchange (602). The cloud exchange may, based on the association indicated by the stored data, send state of the first container of the first private network to the second container of the second private network (604), such as in a hot swap or hot scaling process. This may apply to multiple second containers in a hot scaling process, and the second container may take over all or part of the processing or executing of the first container.

Figure 8:
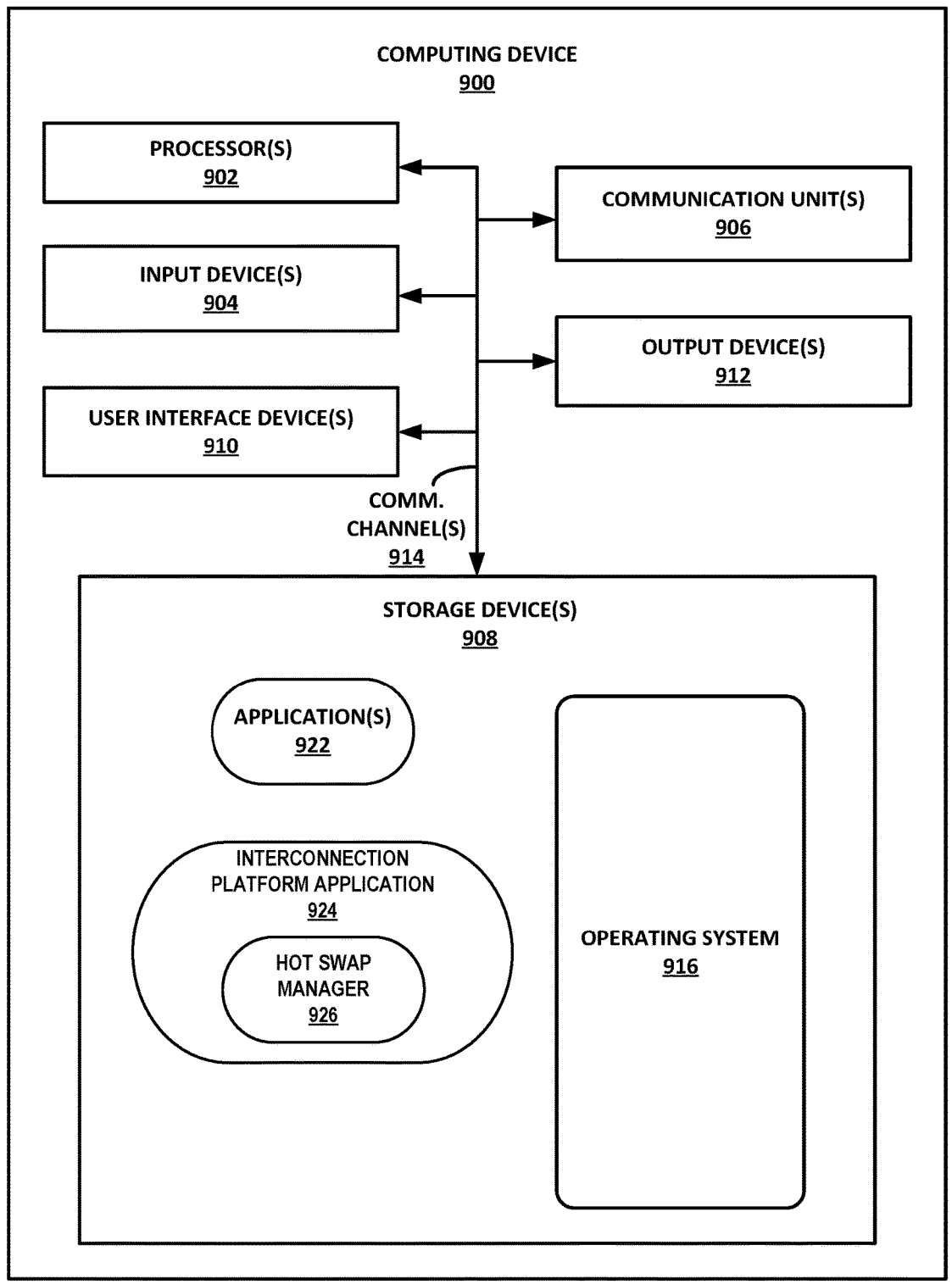
FIG. 8 is a block diagram illustrating one example of a computing device that operates in accordance with one or more techniques of the present disclosure.

FIG. 8 is a block diagram illustrating one example of a computing device that operates in accordance with one or more techniques of the present disclosure. FIG. 8 may illustrate a particular example of a server, a host 304 as shown in FIG. 4, or another computing device 900 that implements cloud exchange 102 or any portion thereof, or that includes one or more processor(s) 902 for executing at least a portion of interconnection platform application 924, or any other computing device described herein. Other examples of computing device 900 may be used in other instances. Although shown in FIG. 8 as a stand-alone computing device 900 for purposes of example, a computing device may be any component or system that includes one or more processors or other suitable computing environment for executing software instructions and, for example, need not necessarily include one or more elements shown in FIG. 8 (e.g., communication units 906; and in some examples components such as storage device(s) 908 may not be colocated or in the same chassis as other components). Computing device 900 may be located and execute, for example, at another interconnection facility, or at a branch office or cloud computing environment employed or used by a colocation facility or cloud exchange provider.

As shown in the specific example of FIG. 8, computing device 900 includes one or more processors 902, one or more input devices 904, one or more communication units 906, one or more output devices 912, one or more storage devices 908, and one or more user interface (UI) devices 910. Computing device 900, in one example, further includes one or more applications 922, interconnection platform application 924, and operating system 916 that are stored on one or more storage devices 908 and executable by computing device 900. Each of components 902, 904, 906, 908, 910, and 912 are coupled (physically, communicatively, and/or operatively) for inter-component communications. In some examples, communication channels 914 may include a system bus, a network connection, an inter-process communication data structure, or any other method for communicating data between the various other components of computing device 900. As one example, components 902, 904, 906, 908, 910, and 912 may be coupled by one or more communication channels 914.

Processors 902, in one example, are configured to implement functionality and/or process instructions for execution within computing device 900. For example, processors 902 may be capable of processing instructions stored in storage device 908. Examples of processors 902 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 908 may be configured to store information within computing device 900 during operation. Storage device 908, in some examples, is described as a computer-readable storage medium. In some examples, storage device 908 is a temporary memory device, meaning that a primary purpose of storage device 908 is not long-term storage. Storage device 908, in some examples, is described as a volatile memory device, meaning that storage device 908 does not maintain stored contents when the computer is turned off. Examples of volatile memory devices include random access memories (RAM), dynamic random access memories (DRAM), static random access memories (SRAM), and other forms of volatile memory devices known in the art. In some examples, storage device 908 is used to store program instructions for execution by processors 902. Storage device 908, in one example, is used by software or applications running on computing device 900 to temporarily store information during program execution.

Storage devices 908, in some examples, also include one or more computer-readable storage media. Storage devices 908 may be configured to store larger amounts of information than volatile memory. Storage devices 908 may further be configured for long-term storage of information. In some examples, storage devices 908 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 900, in some examples, also includes one or more communication units 906. Computing device 900, in one example, utilizes communication units 906 to communicate with external devices via one or more networks, such as one or more wired/wireless/mobile networks. Communication units 906 may include a network interface card, such as an Ethernet card, an optical transceiver, a radio frequency transceiver, or any other type of device that can send and receive information. Other examples of such network interfaces may include 3G, 4G and WiFi radios. In some examples, computing device 900 uses communication unit 906 to communicate with an external device.

Computing device 900, in one example, also includes one or more user interface devices 910. User interface devices 910, in some examples, are configured to receive input from a user through tactile, audio, or video feedback. Examples of user interface devices(s) 910 include a presence-sensitive display, a mouse, a keyboard, a voice responsive system, a video camera, a microphone, or any other type of device for detecting a command from a user. In some examples, a presence-sensitive display includes a touch-sensitive screen.

One or more output devices 912 may also be included in computing device 900. An output device 912, in some examples, is configured to provide output to a user using tactile, audio, or video stimuli. Output device 912, in one example, includes a presence-sensitive display, a sound card, a video graphics adapter card, or any other type of device for converting a signal into an appropriate form understandable to humans or machines. Additional examples of output device 912 include a speaker, a cathode ray tube (CRT) monitor, a liquid crystal display (LCD), or any other type of device that can generate intelligible output to a user.

Computing device 900 may include operating system 916. Operating system 916, in some examples, controls the operation of components of computing device 900. For example, operating system 916, in one example, facilitates the communication of one or more applications 922 and interconnection platform application 924 with processors 902, communication unit 906, storage device 908, input device 904, user interface device 910, and output device 912. Application 922 and interconnection platform application 924 may also include program instructions and/or data that are executable by computing device 900. Interconnection platform application 924 may be configured to, when executed by computing device 900, provide functionality attributed to interconnection platforms described herein, including interconnection platform 103, and components or features thereof such as hot swap manager 140 and orchestration engine 106, as shown in FIGS. 1 and 2.

For example, interconnection platform application 924 may include a hot swap manager 926. Hot swap manager 926 may be implemented as application modules, libraries, features, or other portions of executable instruction code as part of interconnection platform application 924. Hot swap manager 926 may be implemented as a separate application or any other form of executable instruction code in other examples. Hot swap manager 926 may include instructions for causing computing device 900 to perform any of the techniques described in the present disclosure such as with respect to hot swap manager 140 and/or hot swap manager 510 as described above. As one example, hot swap manager 926 may include instructions that cause computing device 900 to store data (on any one or more of computing device 900, orchestration engine 106, networking platform 108, and/or one or more routers 110/200 as shown in FIGS. 1-3, and/or any other computing or networking resource) indicating an association of a first container of a first private network with a second container of a second private network, wherein the first private network and the second private network are coupled to cloud exchange 106 to send and receive data packets via cloud exchange 106. Hot swap manager 926 may also include instructions that cause computing device 900, orchestration engine 106, networking platform 108, and/or one or more routers 110/200 as shown in FIGS. 1-3, and/or any other computing or networking resource, to send, based on the association, state of the first container to the second container. Hot swap manager 926 may also include instructions that cause computing device 900 to perform any other functions of a hot swap and/or hot scaling process in accordance with the techniques of this disclosure.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), Flash memory, a hard disk, a CD- ROM, a floppy disk, a cassette, magnetic media, optical media, or other memory devices and/or computer readable media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

Various examples have been described. These and other examples are within the scope of the following claims.

What is claimed is:

1. A method comprising:
providing, with a cloud exchange, an interface for receiving one or more customer-selected hot swap configuration criteria, wherein the one or more customer-selected hot swap configuration criteria comprises a customer-selected first cloud service provider and a customer-selected second cloud service provider;
associating, in response to receiving the one or more customer-selected hot swap configuration criteria and with the cloud exchange, an address of a first container of a first private network with an address of a second container of a second private network, wherein the first container is hosted by the customer-selected first cloud service provider, and wherein the cloud exchange creates the second container with the customer-selected second cloud service provider;
storing, with the cloud exchange, data indicating the association of the address of the first container of the first private network with the address of the second container of the second private network, wherein the first private network and the second private network are coupled to the cloud exchange to send and receive data packets via the cloud exchange; and
copying, in response to the one or more customer-selected hot swap configuration criteria, with the cloud exchange, and based on the association, state of the first container to the second container.

2. The method of claim 1, further comprising:
receiving, by the cloud exchange, cloud service traffic from an enterprise network; and
redirecting, by the cloud exchange, the cloud service traffic from the first container to the second container.

3. The method of claim 1, wherein the state enables the second container to replicate an operating environment of the first container.

4. The method of claim 1, wherein the state of the first container comprises one or more of: application data, application stack configuration data, microservice state, memory data, commands, process information, and current instruction pointers.

5. The method of claim 1, wherein copying the state of the first container to the second container is performed while the first container is executing one or more applications.

6. The method of claim 1, further comprising registering a registration handle for the second container with the first container via the cloud exchange.

7. The method of claim 6, wherein the registration handle comprises a network address for a host of the second private network that executes the second container, and a container identifier for the second container.

8. The method of claim 6, wherein copying the state of the first container to the second container comprises the first container using the registration handle to communicate the state to the second container via the cloud exchange.

9. The method of claim 1, wherein associating the address of the first container with the second container comprises registering a Uniform Resource Identifier (URI) of the second container with a data store of container information.

10. The method of claim 1, further comprising creating, with the cloud exchange, the second container, prior to associating the address of the first container with the address of the second container.

11. The method of claim 1, further comprising:
partitioning tasks from the first container between the first container and the second container,
wherein the copying the state of the first container to the second container is performed for the tasks partitioned to the second container.

12. The method of claim 11, wherein partitioning the tasks from the first container between the first container and the second container comprises sending units of workload from the first container to the second container in accordance with one or more policies based on content and one or more rules.

13. The method of claim 1, further comprising: maintaining, with the cloud exchange, a data store of container registration information, wherein the container registration information comprises data associating the address of the first container with the second container.

14. The method of claim 1, wherein associating the address of the first container with the address of the second container and copying the state of the first container to the second container are performed in response to a customer-entered request.

15. The method of claim 1, wherein the one or more customer-selected hot swap configuration criteria are stored in an orchestration engine of the cloud exchange.

16. The method of claim 1, wherein associating the address of the first container with the address of the second container and copying the state of the first container to the second container are performed in response to a timing defined by a customer-selected schedule.

17. The method of claim 1, further comprising:
creating a channel from the first container to the second container; and
orchestrating a migration of the state of the first container to the second container.

18. The method of claim 1, further comprising:
placing a hold on operations of the first container prior to copying the state of the first container to the second container; and
re-starting the operations in the second container subsequent to copying the state of the first container to the second container.

19. The method of claim 1, wherein the first container comprises a user-space instance from a plurality of user-space instances that share an operating system executing on a host of the first private network, and
wherein the second container comprises a user-space instance from a plurality of user-space instances that share an operating system executing on a host of the second private network.

20. The method of claim 1, wherein the second private network comprises a cloud service provider network coupled to the cloud exchange to provide, via one or more virtual circuits, a cloud service to one or more enterprise networks coupled to the cloud exchange.

21. A computing system for a cloud exchange, the computing system comprising:
at least one memory device; and at least one processor, operably coupled to the at least one memory device, and configured to execute instructions to:
provide an interface for receiving one or more customer-selected hot swap configuration criteria, wherein the one or more customer-selected hot swap configuration criteria comprises a customer-selected first cloud service provider and a customer-selected second cloud service provider;
associate, in response to receiving the one or more customer-selected hot swap configuration criteria, an address of a first container of a first private network with an address of a second container of a second private network, wherein the first container is hosted by the customer-selected first cloud service provider, and wherein the cloud exchange creates the second container with the customer-selected second cloud service provider;
store data indicating the association of the address of the first container of the first private network with the address of the second container of the second private network, wherein the first private network and the second private network are coupled to the cloud exchange to send and receive data packets via the cloud exchange; and
copy, in response to the one or more customer-selected hot swap configuration criteria and based on the association, state of the first container to the second container.

22. The computing system of claim 21, wherein the at least one processor is further configured to execute instructions to:
receive cloud service traffic from an enterprise network; and
redirect the cloud service traffic from the first container to the second container.

23. The computing system of claim 21, wherein the state of the first container comprises one or more of: application data, application stack configuration data, microservice state, memory data, commands, process information, and current instruction pointers, and wherein the state enables the second container to replicate an operating environment of the first container.

24. The computing system of claim 21, wherein the at least one processor is further configured to execute instructions to copy the state of the first container to the second container while the first container is executing one or more applications.

25. The computing system of claim 21, wherein the at least one processor is further configured to execute instructions to register a registration handle for the second container with the first container via the cloud exchange,
wherein the registration handle comprises a network address for a host of the second private network that executes the second container, and a container identifier for the second container, and
wherein copying the state of the first container to the second container comprises the first container using the registration handle to communicate the state to the second container via the cloud exchange.

26. The computing system of claim 21, wherein the at least one processor is further configured to execute instructions to create the second container, prior to associating the address of the first container with associating the address of the second container.

27. The computing system of claim 21, wherein the at least one processor is further configured to execute instructions to:
partition tasks from the first container between the first container and the second container,
wherein the copying the state of the first container to the second container is performed for the tasks partitioned to the second container, and
wherein partitioning the tasks from the first container between the first container and the second container comprises sending units of workload from the first container to the second container in accordance with one or more policies based on content and one or more rules.

28. A Non-transitory computer-readable storage medium comprising instructions for causing at least one programmable processor of a cloud exchange to:
provide an interface for receiving one or more customer-selected hot swap configuration criteria, wherein the one or more customer-selected hot swap configuration criteria comprises a customer-selected first cloud service provider and a customer-selected second cloud service provider;
associate, in response to receiving the one or more customer-selected hot swap configuration criteria, an address of a first container of a first private network with an address of a second container of a second private network, wherein the first container is hosted by the customer-selected first cloud service provider, and wherein the cloud exchange creates the second container with the customer-selected second cloud service provider;
store data indicating an the association of the address of the first container of the first private network with the address of the second container of the second private network, wherein the first private network and the second private network are coupled to the cloud exchange to send and receive data packets via the cloud exchange;
copy, in response to the one or more customer-selected hot swap configuration criteria and based on the association, state of the first container to the second container;
receive, by the cloud exchange, cloud service traffic from an enterprise network; and
redirect, by the cloud exchange, the cloud service traffic from the first container to the second container.

\* \* \* \* \*